United States Patent
Matsuo et al.

(10) Patent No.: US 10,068,161 B2
(45) Date of Patent: Sep. 4, 2018

(54) APPARATUS AND METHOD FOR MAINTENANCE OF AN IMAGE FORMING APPARATUS

(71) Applicant: CANON KABUSHIKI KAISHA, Tokyo (JP)

(72) Inventors: Makoto Matsuo, Kashiwa (JP); Dai Kanai, Abiko (JP); Teppei Nagata, Abiko (JP); Hideki Mori, Toride (JP); Jun Shirayanagi, Ushiku (JP); Kotaro Torikata, Chigasaki (JP); Kenta Koyama, Tokyo (JP); Hideki Takaoka, Kawasaki (JP); Masatoshi Lin, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/386,783

(22) Filed: Dec. 21, 2016

(65) Prior Publication Data
US 2017/0185878 A1    Jun. 29, 2017

(30) Foreign Application Priority Data
Dec. 24, 2015  (JP) ................................. 2015-252407

(51) Int. Cl.
*G06K 15/00* (2006.01)
*H04N 1/00* (2006.01)
(Continued)

(52) U.S. Cl.
CPC ....... *G06K 15/4025* (2013.01); *G06K 15/408* (2013.01); *H04N 1/00015* (2013.01);
(Continued)

(58) Field of Classification Search
None
See application file for complete search history.

(56) References Cited

U.S. PATENT DOCUMENTS 6,750,878 B1 * 6/2004 Tatsuo .................... B41J 3/46
                                                        399/81
2006/0290949 A1 * 12/2006 Nogawa ............ H04N 1/00408
                                                        358/1.1
(Continued)

FOREIGN PATENT DOCUMENTS

JP    2001-247235 A       9/2001
JP    2009298561 A    * 12/2009
JP    2011-107360 A       6/2011

OTHER PUBLICATIONS

Inoue et al., JP-2009-298561 English Translation, Dec. 24, 2009, Fig 15, par 0074-0076.*

*Primary Examiner* — Miya J Williams
(74) *Attorney, Agent, or Firm* — Canon USA Inc., IP Division

(57) ABSTRACT

An image forming apparatus and method for controlling an image forming apparatus is provided. The image forming apparatus includes a detecting unit, a projecting unit, and a control unit. The detecting unit is configured to detect an event that needs user work on the image forming apparatus. The projecting unit is configured to project an image onto a projection target. The control unit is configured to control projection by the projecting unit. When an event that needs user work on the image forming apparatus is detected, the projecting unit projects an image onto a projection target so that a target portion of the user work can be identified and also projects an instruction image for performing the user work.

18 Claims, 35 Drawing Sheets

(51) Int. Cl.
  *G03G 15/00*   (2006.01)
  *B41J 11/00*   (2006.01)
(52) U.S. Cl.
  CPC ..... *H04N 1/00037* (2013.01); *H04N 1/00082* (2013.01); *H04N 1/00267* (2013.01); *H04N 1/00954* (2013.01); *B41J 11/0075* (2013.01); *G03G 15/55* (2013.01); *G03G 15/553* (2013.01); *H04N 1/00249* (2013.01); *H04N 2201/0082* (2013.01); *H04N 2201/0098* (2013.01); *H04N 2201/3273* (2013.01)

(56) References Cited

U.S. PATENT DOCUMENTS

| | | | | |
|---|---|---|---|---|
| 2007/0014580 A1* | 1/2007 | Woo | ................... | G03G 21/1638 399/21 |
| 2009/0213436 A1* | 8/2009 | Takuwa | ............. | H04N 1/00384 358/442 |
| 2009/0225348 A1* | 9/2009 | Miyake | .............. | G03G 15/5004 358/1.14 |
| 2011/0227951 A1* | 9/2011 | Kubo | .................. | H04L 12/1827 345/667 |
| 2012/0026530 A1* | 2/2012 | Tsongas | ............. | H04N 1/00307 358/1.14 |
| 2012/0063801 A1* | 3/2012 | Higashi | .............. | G03G 15/5016 399/81 |
| 2012/0230747 A1* | 9/2012 | Cole | ...................... | B41J 11/006 400/582 |
| 2013/0135646 A1* | 5/2013 | Akiyama | .................. | G06F 3/12 358/1.13 |
| 2014/0146342 A1* | 5/2014 | Ishii | ................... | G06K 15/4085 358/1.14 |
| 2015/0365542 A1* | 12/2015 | Kim | .................. | H04N 1/00079 358/1.14 |

* cited by examiner

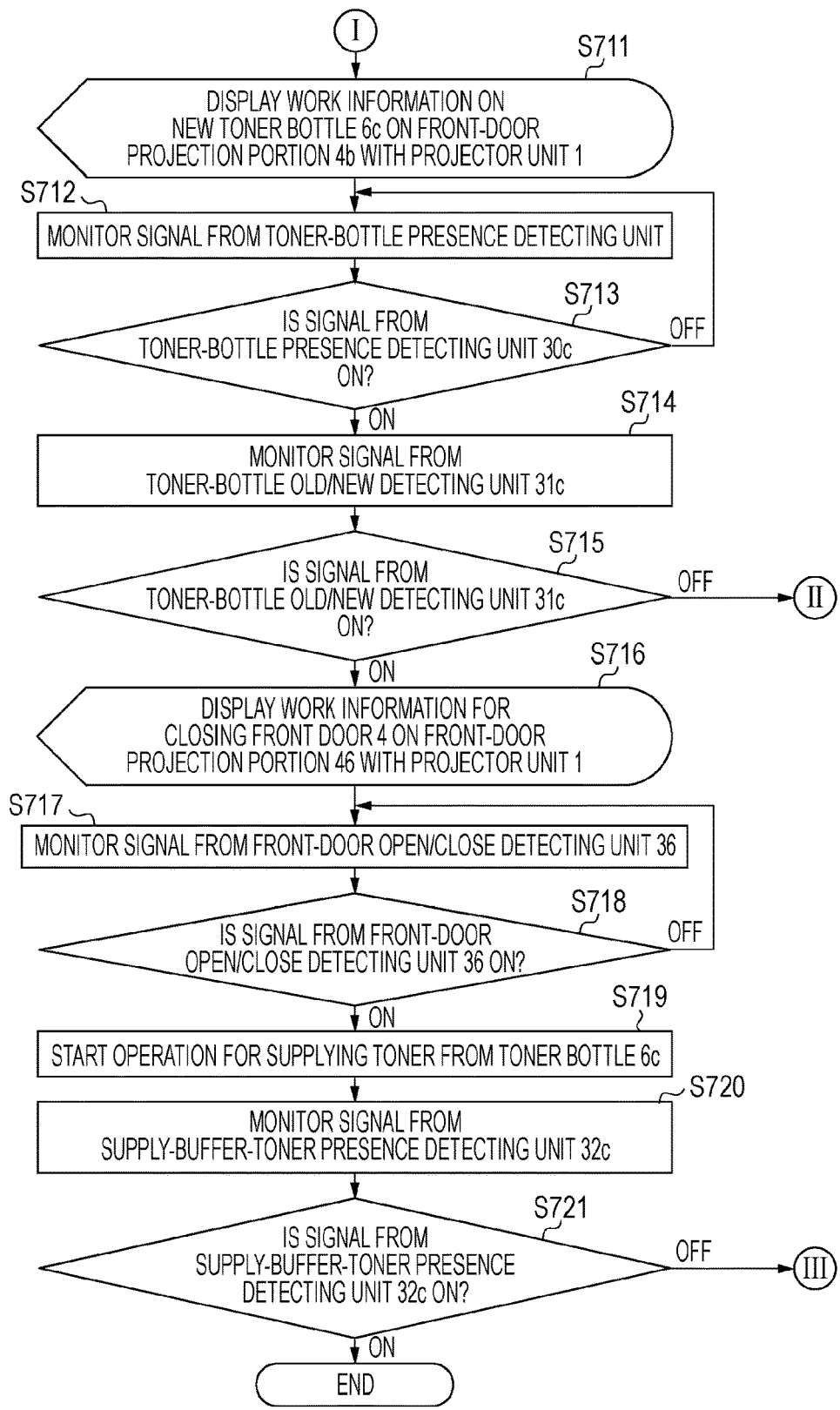

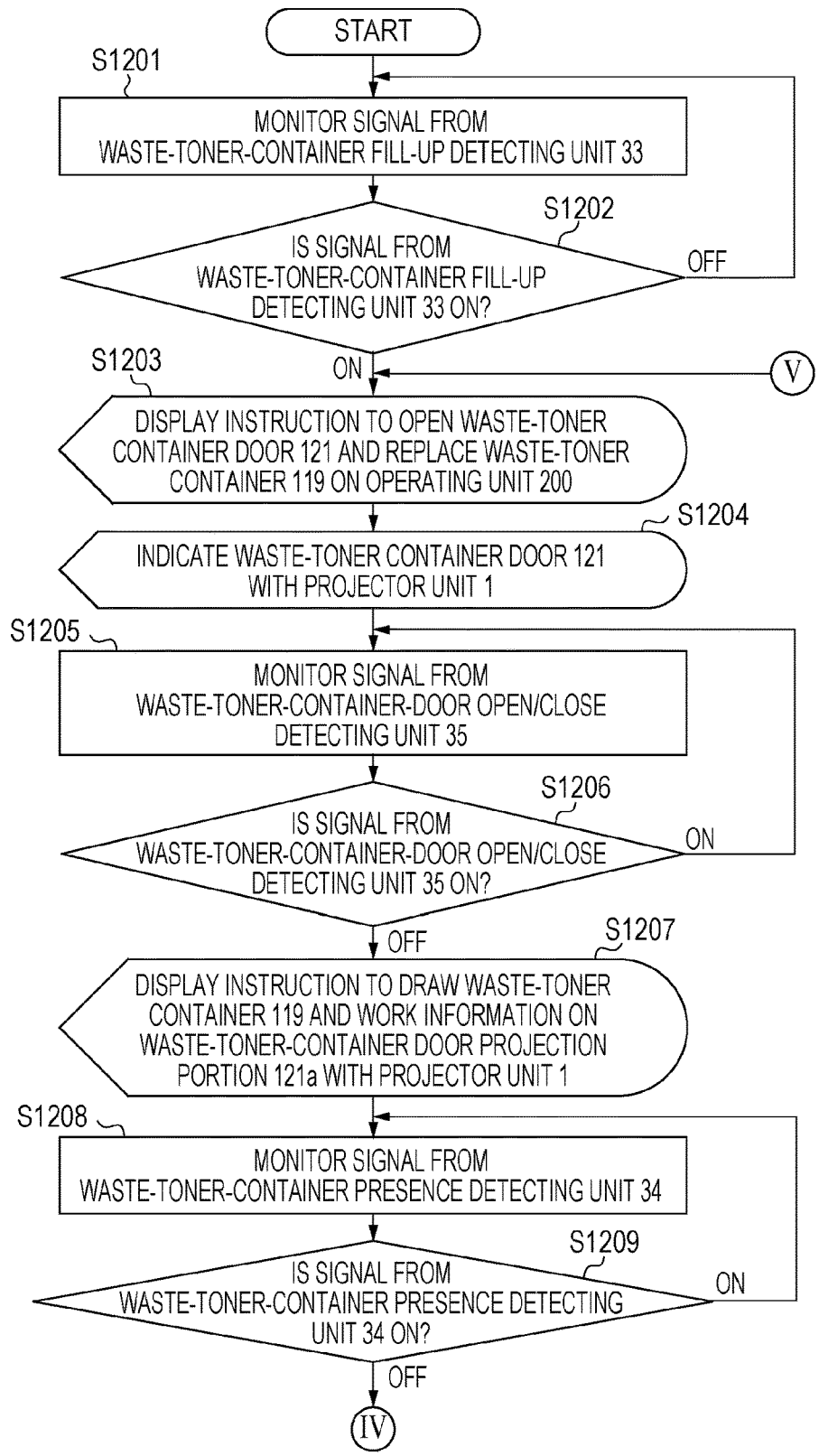

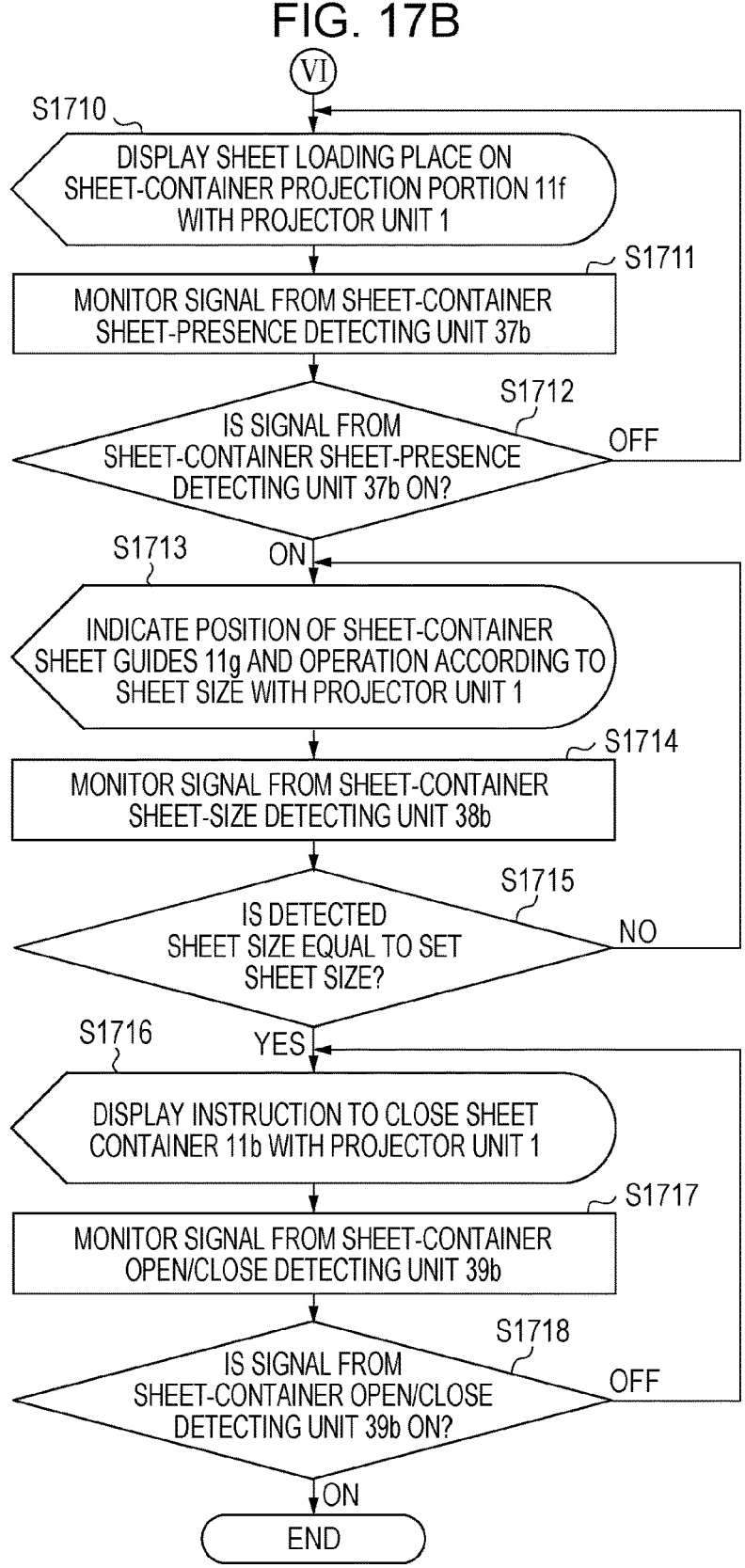

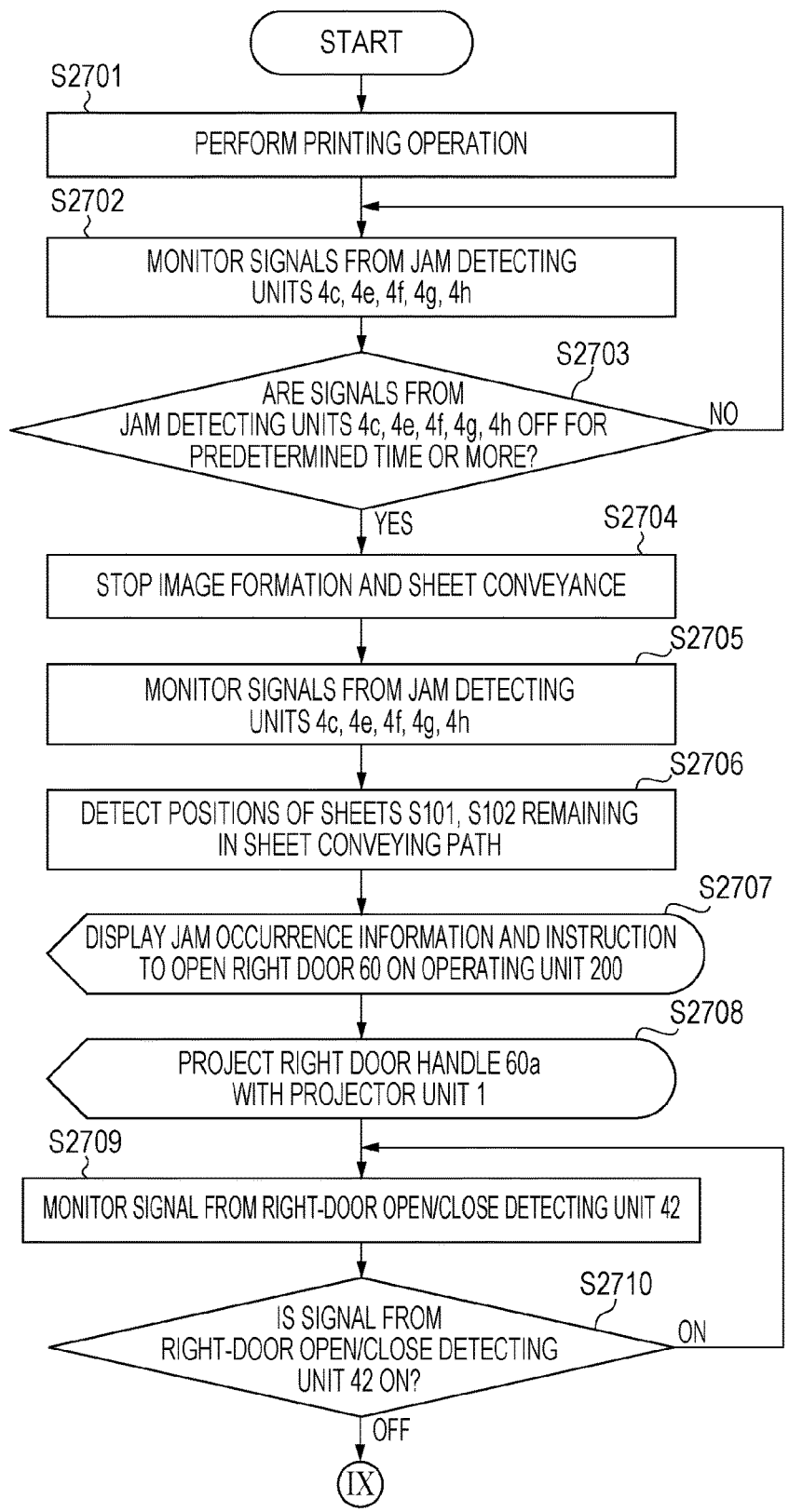

APPARATUS AND METHOD FOR MAINTENANCE OF AN IMAGE FORMING APPARATUS

BACKGROUND OF THE INVENTION

Field of the Invention

The present disclosure relates to an image forming apparatus for forming an image on a printing medium and a method for the same.

Description of the Related Art

In electrophotographic image forming apparatuses, such as known copying machines, users sometimes perform maintenance work, for example, clearance of a paper jam, replacement of components, supply of toner, and supply of sheets. An exemplary method for informing the user about a working procedure, precautions, and other information using a projector is disclosed in Japanese Patent Laid-Open No. 2011-107360, in which information on printed materials and the state of the apparatus is projected by a projector that projects a display image onto a display surface of a display target by scanning light.

Japanese Patent Laid-Open No. 2001-247235 discloses a configuration including a jam detecting unit that detects a paper jam in an image forming apparatus, a display unit in the casing, which displays a method for clearing the jam, and a light-emitting unit in a display portion. The configuration of Japanese Patent Laid-Open No. 2001-247235 allows a jammed portion to be displayed by making the light-emitting unit in the display portion emit light according to a jam signal detected by the jam detecting unit.

However, in the above two configurations, a portion under maintenance work (user work) and the display portion that displays a work portion and information necessary for the maintenance work (an instruction for the work) in the apparatus main body differ. This requires that the user performs the maintenance work while alternately checking the work portion (the target portion of the work) and the display portion. To check the display portion, the user looks away from the work portion. This can bother the user to find the work portion.

SUMMARY OF THE INVENTION

The present disclosure provides an image forming apparatus in which the efficiency of user maintenance work is increased and a method for controlling the same.

The present disclosure provides an image forming apparatus for forming an image on a sheet. The apparatus includes a detecting unit, a projecting unit, and a control unit. The detecting unit is configured to detect an event that needs user work on the image forming apparatus. The projecting unit is configured to project an image onto a projection target. The control unit is configured to control projection by the projecting unit. When the event is detected by the detecting unit, the control unit controls the projecting unit to project the image so that a target portion of the user work can be identified and to project an instruction image for performing the user work.

Further features of the present invention will become apparent from the following description of exemplary embodiments with reference to the attached drawings.

BRIEF DESCRIPTION OF THE DRAWINGS

FIG. 7B is a flowchart for the display control process.

FIG. 12A is a flowchart for a display control process according to the second embodiment.

FIG. 17B is a flowchart for the display control process according to the third embodiment.

FIG. 27A is a flowchart for a display control process according to the fifth embodiment.

DESCRIPTION OF THE EMBODIMENTS

Embodiments of the present disclosure will be described in detail hereinbelow with reference to the accompanying drawings. It is to be understood that the following embodiments are not intended to limit the present disclosure according to the claims and that not all of the combinations described in the embodiments are necessary for the present disclosure. Like components are given like reference signs, and descriptions thereof will be omitted.

First Embodiment

In this embodiment, work to replace a toner bottle 6c in which the toner level becomes zero or less than a predetermined threshold into a low toner level state will be described as an example of the user maintenance work (user work). The low toner level corresponds to an event that needs maintenance work.

Figure 1:
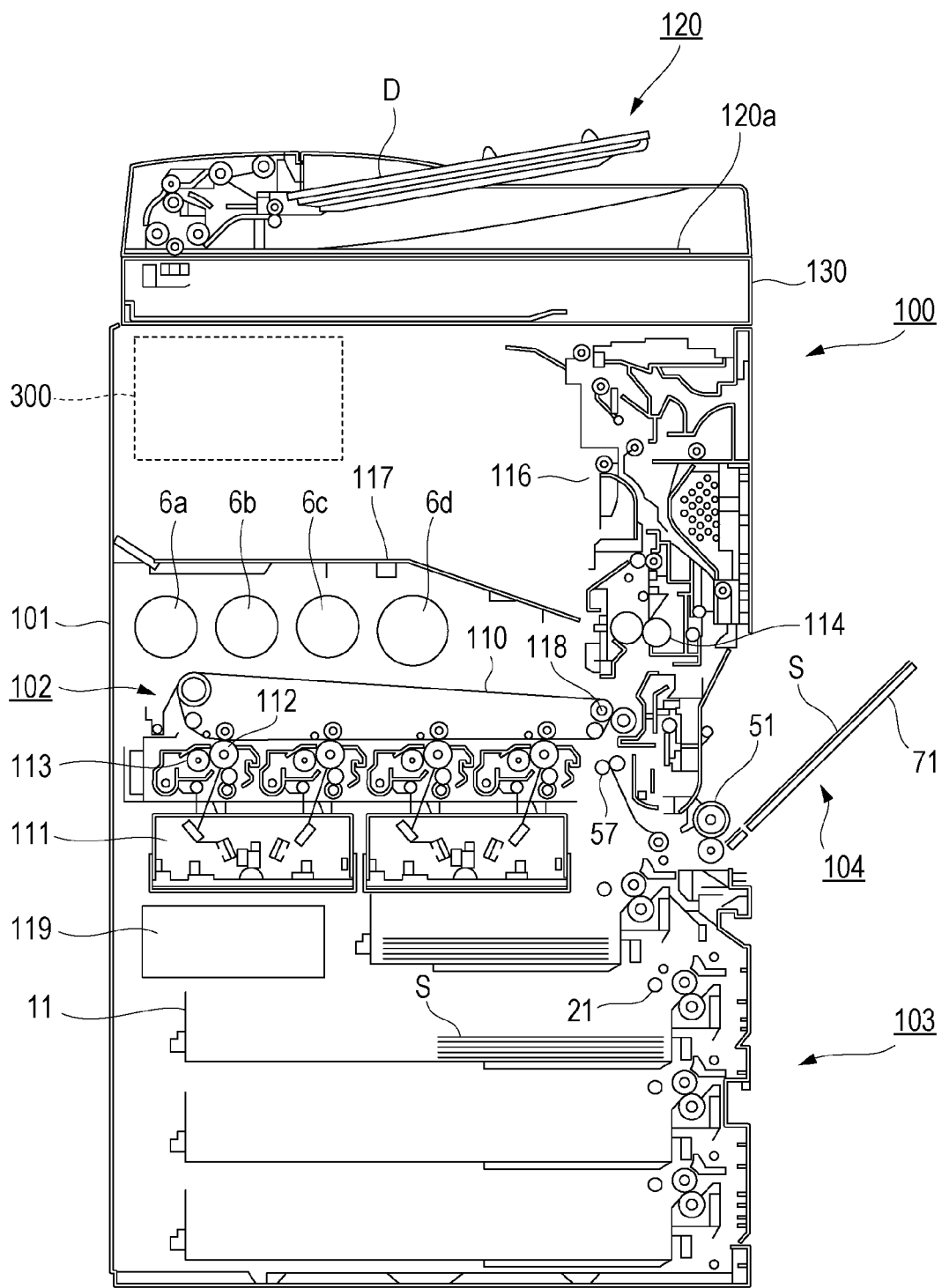
FIG. 1 is a diagram illustrating the configuration of an image forming apparatus according to an embodiment of the present disclosure.

FIG. 1 is a diagram illustrating the configuration of an image forming apparatus 100. An image scanning unit 130 is provided on the top of a printer main body 101. The image scanning unit 130 scans a document D placed on a platen glass 120a serving as a document table by an automatic document feeding unit 120. An image forming unit 102, a sheet feeding unit 103 and a manual feeding unit 104 that feed sheets (printing media) S to the image forming unit 102 are provided below the image scanning unit 130. The image forming unit 102 includes laser scanner units 111, photosensitive drums 112, developing units 113, and toner bottles 6a, 6b, 6c, and 6d. The sheet feeding unit 103 includes a plurality of sheet containers 11 (trays) containing the sheets S and detachable from the printer main body 101 and pick-up rollers 21 serving as sheet feeders that feed the sheets S contained in the sheet containers 11.

The manual feeding unit 104 includes a sheet feed tray 71 (manual feed tray) openably provided on one side of the printer main body 101, on which the sheets S are stacked, and a feed roller 51 serving as a sheet feeder that feeds the sheets S stacked on the sheet feed tray 71. In using the manual feeding unit 104, the user opens the sheet feed tray 71 into a position at which the sheets S can be fed and loads desired sheets S on the projecting sheet feed tray 71, so that the loaded sheets S are fed.

Next, an image forming operation of the image forming apparatus 100 will be described. When an image-scan instruction signal is output from a control unit 300 disposed in the printer main body 101 to the image scanning unit 130, an image on the document D is scanned by the image scanning unit 130. Thereafter, laser beams corresponding to scan signals are applied from the laser scanner units 111 onto the individual photosensitive drums 112. Each photosensitive drum 112 is charged with electricity in advance, and when irradiated with the laser beam, an electrostatic latent image is formed on the photosensitive drum 112. The electrostatic latent image is developed by the developing unit 113, so that a toner image is formed on the photosensitive drum 112. The thus-formed toner image is primarily transferred onto the outer periphery of an intermediate transfer belt 110, so that the toner image is formed on the intermediate transfer belt 110. When the control unit 300 outputs a sheet feed signal to the sheet feeding unit 103, the sheets S are fed from one of the sheet containers 11, which are sheet containing units, by corresponding one of the pick-up rollers 21. When the control unit 300 outputs a sheet feed signal to the manual feeding unit 104, the sheets S are fed from the sheet feed tray 71, which is another sheet containing unit, by the feed roller 51. The fed sheets S are then corrected in skew by a skew correcting unit including a resist roller pair 57 and are then conveyed to a transfer unit including the intermediate transfer belt 110 and a secondary transfer roller 118 in synchronism with the toner image on the intermediate transfer belt 110. The toner image is transferred to the sheet S conveyed to the transfer unit, and the sheet S is then conveyed to a fixing unit 114. The sheet S is heated and pressed by the fixing unit 114, so that the unfixed transferred image is permanently fixed to the sheet S. The permanently fixed sheet S is discharged from the printer main body 101 onto an output tray 117 by a discharge roller 116. Toner remaining on the photosensitive drums 112 and the intermediate transfer belt 110 is scraped by a cleaner (not shown) and is collected into a toner reclaim container 119 (hereinafter simply referred to as "waste-toner container").

Figure 2:
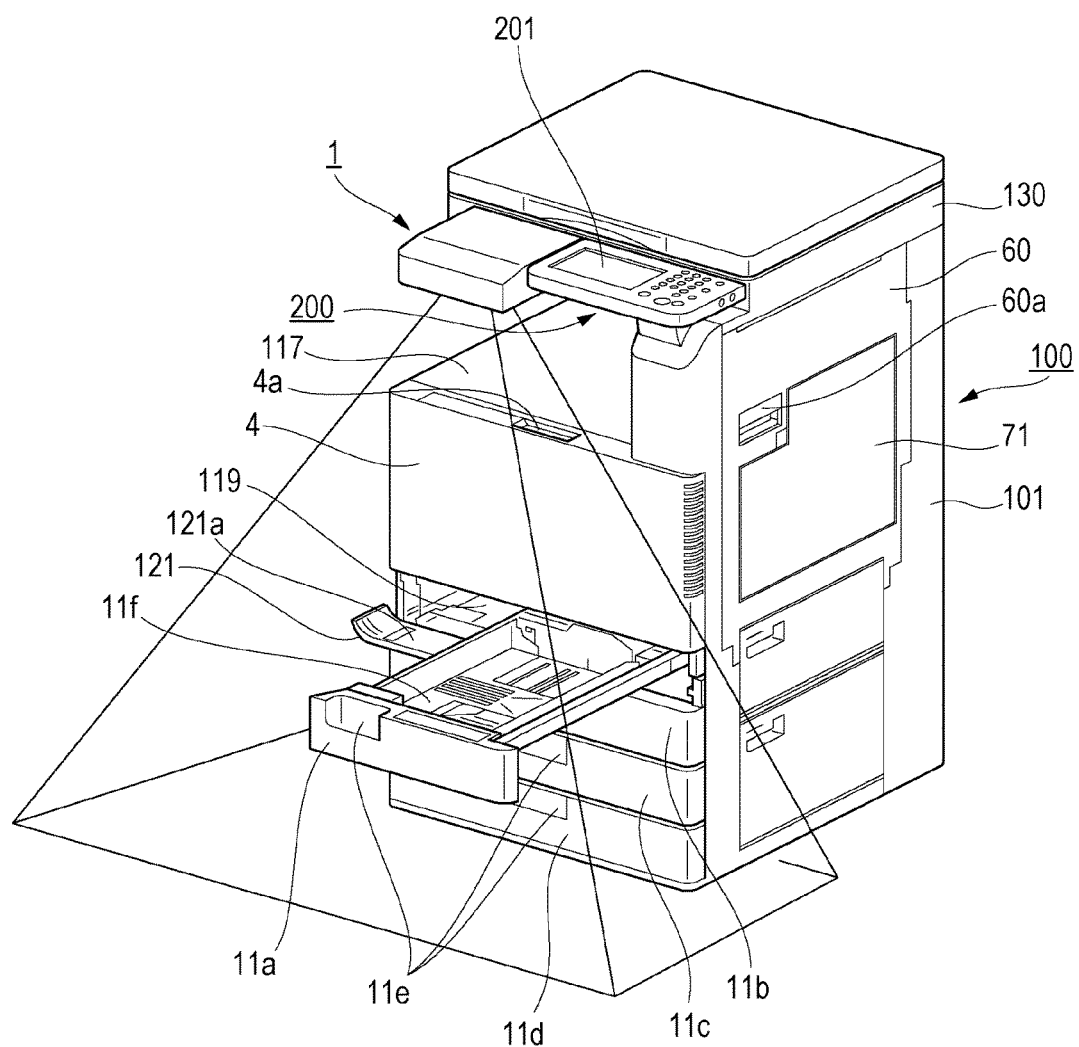
FIG. 2 is a perspective view of the image forming apparatus illustrating a state in which a projector unit is mounted thereon.
Figure 3:
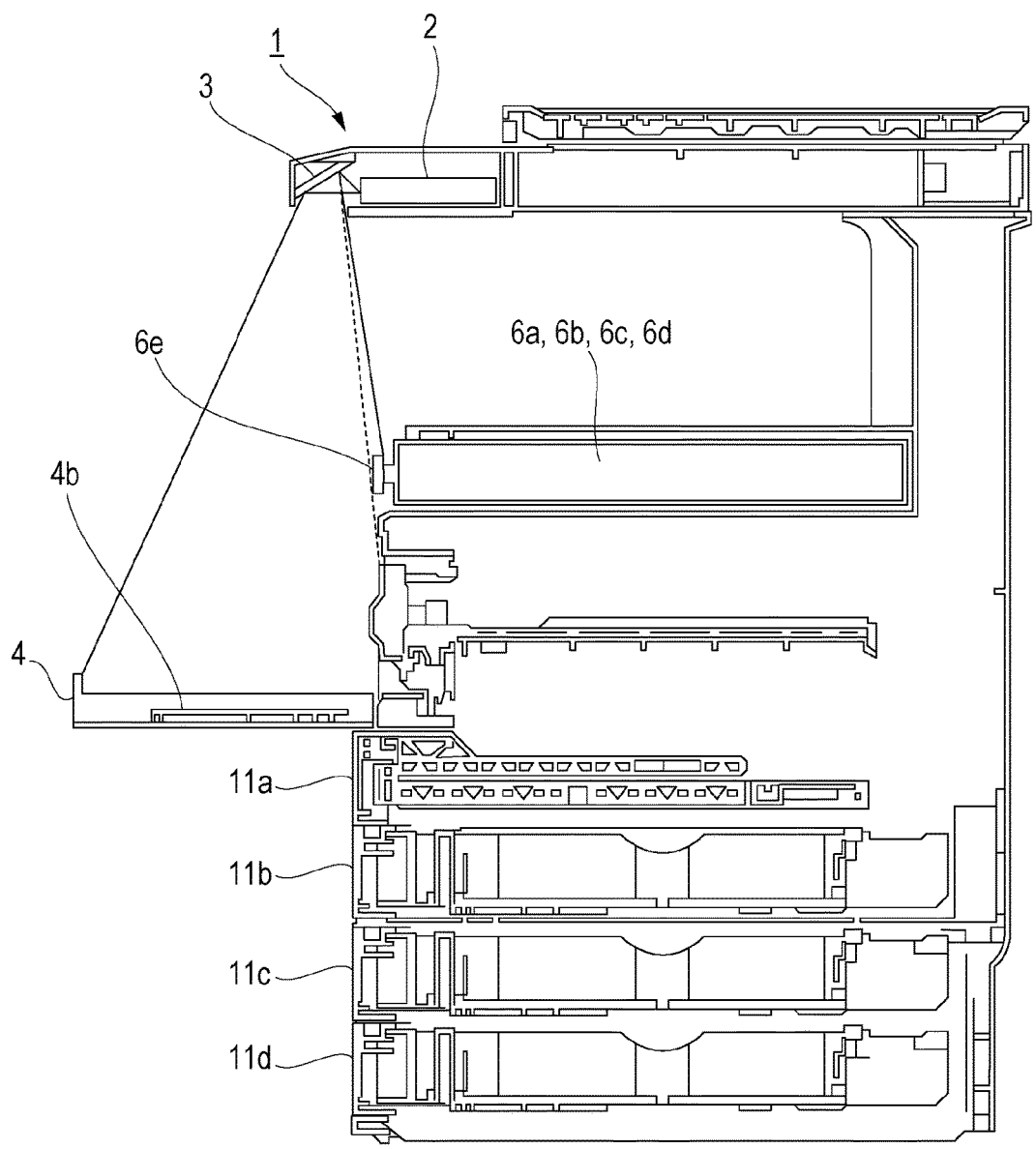
FIG. 3 is a side view of the image forming apparatus illustrating a state in which a projector unit is mounted thereon.

As illustrated in FIGS. 2 and 3, the image scanning unit 130 of the image forming apparatus 100 includes, at the front, a projector unit 1 and an operating unit 200 including a liquid-crystal screen 201 on which various settings, such as process conditions on the sheets S, can be received. The projector unit 1 includes a projector 2 and a reflecting mirror 3, so that an image can be projected by projecting light from the projector unit 1 toward a projection target below the projector unit 1. The projector unit 1 can project an image onto the handle 6e of each of the toner bottles 6a, 6b, 6c, and 6d, and a front-door projection portion 4b provided inside a front door 4 which is opened by pulling a front-door handle 4a. The projector unit 1 can also project an image onto a waste-toner-container-door projection portion 121a provided inside an opened waste-toner container door 121 or the waste-toner container 119 that is drawn out. The waste-toner container door 121 is a cover of a container that contains the waste-toner container 119, which is opened and closed to replace the waste-toner container 119. The projector unit 1 can also project an image onto a sheet-container projection unit 11f provided inside each sheet container 11 which is opened by pulling a sheet container handle 11e. A conveying path for the sheets S is provided at the right of the printer main body 101. When a jam occurs while the sheets S is being conveyed (a sheet jam in the conveying path), the user opens a right door 60 by pulling a right-door handle 60a to remove the sheet S in the sheet S conveying path.

Figure 4:
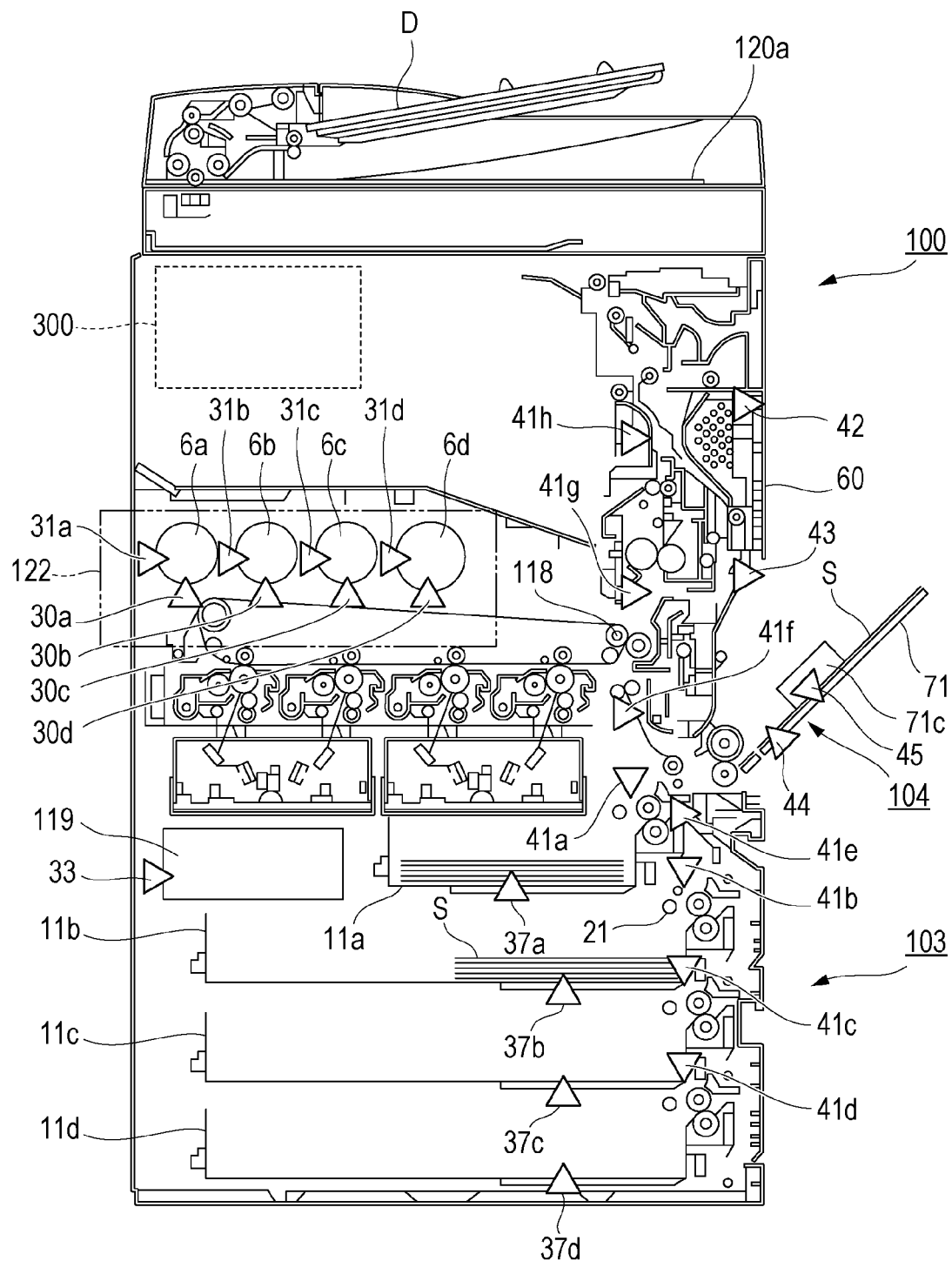
FIG. 4 is a diagram illustrating the layout of detecting units in the image forming apparatus.
Figure 5:
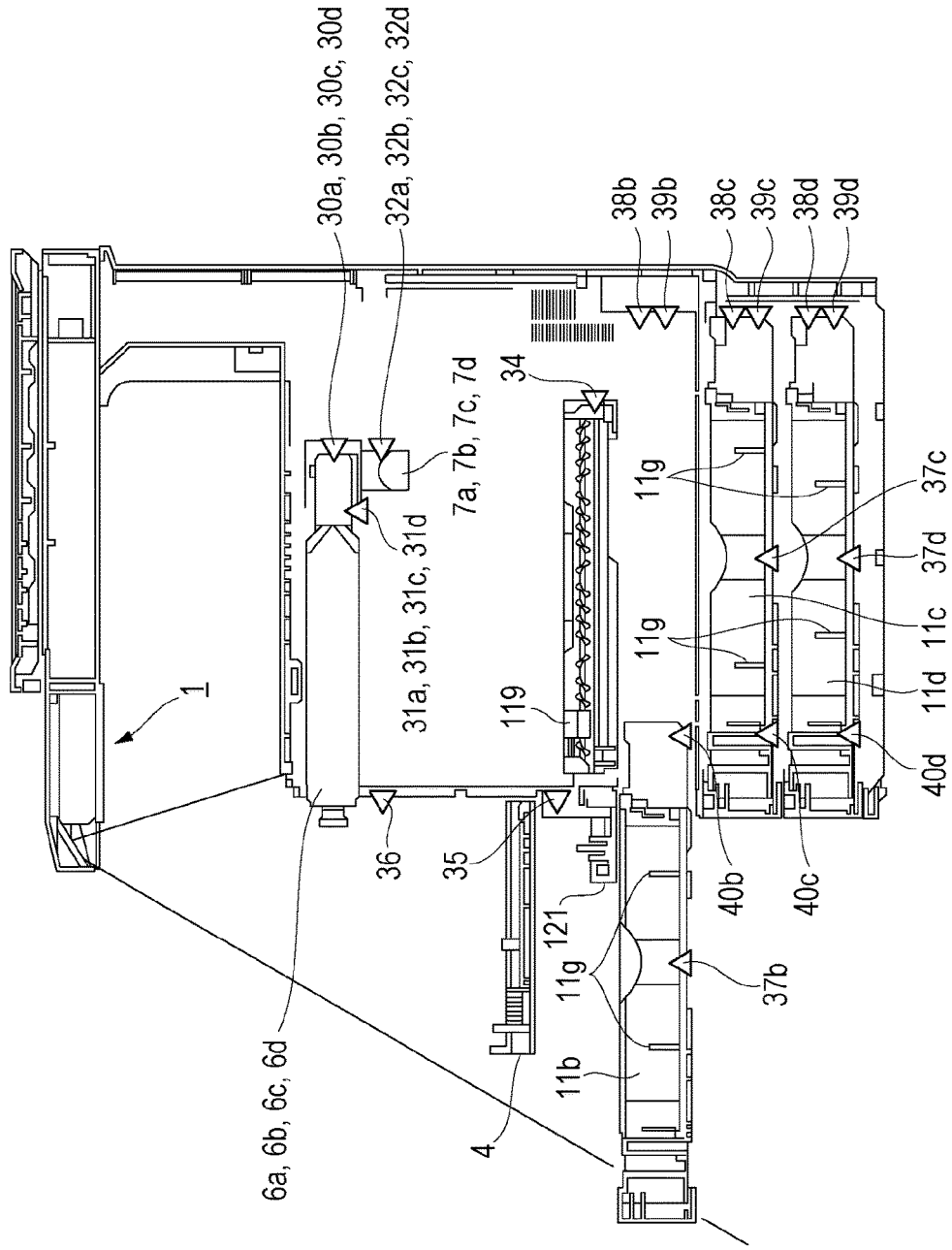
FIG. 5 is a diagram illustrating the layout of detecting units in the image forming apparatus.

FIGS. 4 and 5 illustrate the layout of detecting units provided in the image forming apparatus 100. A toner supply unit 122 includes mounts for the four kinds of toner bottles 6a, 6b, 6c, and 6d. When the toner bottles 6a, 6b, 6c, and 6d are mounted in position, the bottles 6a, 6b, 6c, and 6d come into contact with flags, and toner-bottle presence detecting units 30a, 30b, 30c, and 30d determines whether bottles are present using photo-interrupters. The mounts are provided with toner-bottle old/new detecting units 31a, 31b, 31c, and 31d that detect that used toner bottles or different color toner bottles are mounted by distinguishing labels on the toner bottles 6a, 6b, 6c, and 6d. After it is detected by the old/new detecting units 31a, 31b, 31c, and 31d that toner bottles suitable for the image-forming operation are mounted, a toner supply operation is performed, and toner supply buffers 7a, 7b, 7c, and 7d are supplied with color toners. The toner supply buffers 7a, 7b, 7c, and 7d are therein provided with supply-buffer-toner presence detecting units 32a, 32b, 32c, and 32d using piezoelectric sensors to detect whether toner is present. The supply-buffer-toner presence detecting units 32a, 32b, 32c, and 32d allow detection whether toner is supplied in response to an operation of supplying toners from the toner bottles 6a, 6b, 6c, and 6d. When a toner supply operation is appropriately performed, so that the toner supply buffers 7a, 7b, 7c, and 7d are supplied with toners, the individual color developing units 113 are supplied with toners for use in the image forming process.

Part of the toners is collected into the waste-toner container 119 through the image forming operation. To prevent the amount of toner collected from exceeding the capacity of the waste-toner container 119, the printer main body 101 is provided with a waste-toner-container fill-up detecting unit 33 that detects the amount of toner using a piezoelectric sensor. If the waste-toner-container fill-up detecting unit 33 detects that the capacity of the waste-toner container 119 is filled up, the user takes out the waste-toner container 119 from the printer main body 101 and replaces it with an empty waste-toner container 119. To detect that the waste-toner container 119 is mounted to a predetermined position, the printer main body 101 is provided with a waste-toner-container presence detecting unit 34 including a flag that is to come into contact with the waste-toner container 119 and a photo-interrupter that detects the position of the flag. A portion at which the waste-toner container 119 is mounted is provided with a waste-toner container door 121. The waste-toner container door 121 is provided with a flag. The printer main body 101 is provided with a waste-toner-container-door open/close detecting unit 35 that detects the position of the flag using a photo-interrupter to allow detection whether the waste-toner container door 121 is opened. To attach or detach the toner bottles 6a, 6b, 6c, and 6d to/from the main body, the user opens and closes the front door 4 at the front of the printer main body 101. For this reason, the front door 4 is provided with a flag, and the printer main body 101 is provided with a front-door open/close detecting unit 36 that detects the position of the flag using a photo-interrupter to detect whether the front door 4 is opened or closed.

For conveyance of the sheets S, the sheet conveying path is also provided with various kinds of sensor. The sheet containers 11a, 11b, 11c, and 11d are respectively provided with sheet-container sheet-presence detecting units 37a, 37b, 37c, and 37d that detect whether sheets S are loaded and sheet-container sheet guides 11g that align the position of supply sheets S. The size of the loaded sheets S is detected by a sheet-container sheet-size detecting unit 38a, 38b, 38c, or 38d that is operably connected to the sheet-container sheet guides 11g at the same time when the sheet position is aligned. The sheet containers 11a, 11b, 11c, and 11d are respectively provided with sheet-container open/close detecting unit 39a, 39b, 39c, and 39d that detect whether the sheet containers 11a, 11b, 11c, and 11d are open or closed. The sheet containers 11a, 11b, 11c, and 11d are further respectively provided with sheet-container position detecting units 40a, 40b, 40c, and 40d to detect the positions of the drawn sheet containers 11a, 11b, 11c, and 11d.

The sheets S fed from the individual sheet containers 11a, 11b, 11c, and 11d are conveyed through the sheet conveying path. The conveying path is provided with jam detecting units 41a, 41b, 41c, 41d, 41e, 41f, 41g, and 41h that detect the timing of passage using flags that come into contact with the sheets S and photo-interrupters to detect a sheet jam. If a jam occurs in the sheet conveying path, the right door 60 is opened and the jammed sheet in the conveying path is removed by the user. For this reason, the right door 60 is provided with a flag, and the printer main body 101 is provided with a right-door open/close detecting unit 42 that detects the position of the flag using a photo-interrupter to detect whether the right door 60 is opened or closed.

The manual feeding unit 104 provided at the right door 60 is configured to be opened or closed with respect to the right door 60. The manual feeding unit 104 is provided with a flag. The right door 60 is provided with a sheet-feed-tray open/close detecting unit 43 that detects the position of the flag using a photo-interrupter to detect whether the manual feeding unit 104 is opened or closed. The manual feeding unit 104 is also provided with a sheet-feed-tray sheet-presence detecting unit 44 that detects whether sheets S are present at a supply-sheet load portion and a sheet-feed-tray sheet-size detecting unit 45 that detects the size of the sheets S from the position of the sheet-feed-tray guides 71c to align the sheets S at a predetermined position. Although the above various detecting units in this embodiment include sensor flags and photo-interrupters, non-contact reflective sensors, line sensors, or other sensors may be used.

Figure 6A:
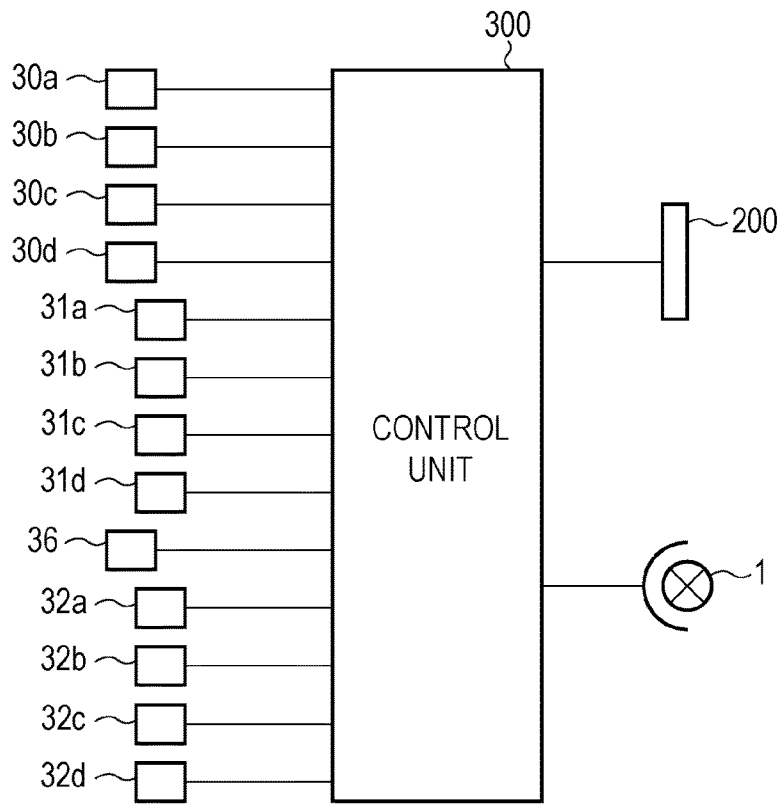
FIG. 6A is a block diagram illustrating the relationship among a control unit, detecting units, and an output unit.

FIG. 6A is a block diagram illustrating the relationship among the control unit 300, the various detecting units, and an output unit. The operating unit 200 and the projector unit 1 are connected to the control unit 300. The toner-bottle presence detecting units 30a, 30b, 30c, and 30d, the toner-bottle old/new detecting units 31a, 31b, 31c, and 31d, the supply-buffer-toner presence detecting units 32a, 32b, 32c, and 32d, and the front-door open/close detecting unit 36 are connected to the control unit 300. The control unit 300 controls information displayed with the operating unit 200 and the projector unit 1 according to information sent from the individual detecting units.

Figure 6B:
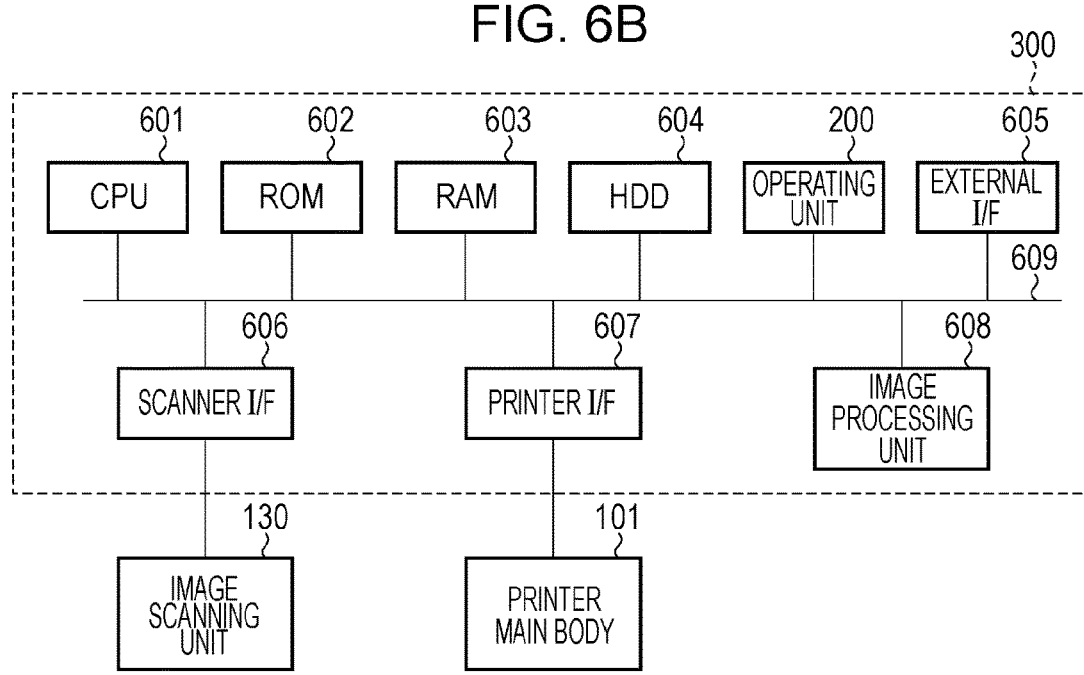
FIG. 6B is a block diagram illustrating the configuration of the control unit.

FIG. 6B is a block diagram illustrating the configuration of the control unit 300. The control unit 300 includes a central processing unit (CPU) 601, a read-only memory (ROM) 602, a random access memory (RAM) 603, a hard disk drive (HDD) 604, the operating unit 200, an external interface (IF) 605, a scanner IF 606, a printer IF 607, and an image processing unit 608. They are connected so as to communicate with one another via a system bus 609. The CPU 601 integrally controls the image forming apparatus 100. For example, the CPU 601 executes instructions received from the user on the operating unit 200 by reading programs stored in the ROM 602 into the RAM 603. For example, when the operating unit 200 receives an instruction to execute a copy function from the user, the CPU 601 instructs the image scanning unit 130 to execute a scanning operation via the scanner IF 606 and instructs the printer main body 101 to execute a printing operation via the printer IF 607. The image scanning unit 130 and the printer main body 101 can respectively include a CPU that integrally controls the image scanning unit 130 and a CPU that integrally controls the printer main body 101. In this case, the CPUs operate in cooperation with the CPU 601 of the control unit 300.

The CPU 601 also controls the projector unit 1 in FIG. 6A. For example, the CPU 601 can project an image for highlighting a predetermined position onto a predetermined position of the surface of the casing of the image forming apparatus 100. The external IF 605 can communicate with an external device via a network, such as a LAN. For example, the external IF 605 receives a scan job or a print job from an external host computer. The operating unit 200 includes a display that displays apparatus information, a job processing status, and so on and a key for accepting instructing operations from the user.

The image processing unit 608 executes image processing corresponding to the functions of the image forming apparatus 100 on scan data or various image data acquired by the image scanning unit 130. For example, if the printer main body 101 is used for printing, the image processing unit 608 executes correction, color-space conversion, and other processing on the image data.

In this embodiment, projection image data that the projector unit 1 projects is stored in a storage area, such as the ROM 602, in advance according to the projection surface (projection portion). For example, in projecting rectangular image data with the projector unit 1, if the projection surface is perpendicular to the projecting direction of the projector unit 1, it is only required that rectangular image data is output to the projector unit 1. However, if the projection surface is not perpendicular to the projecting direction of the projector unit 1 shown in FIG. 2, for example, if the projector unit 1 projects image data onto the surface of the printer main body 101, rectangular image data output from the projector unit 1 would form a distorted projected image. For that reason, in this embodiment, trapezoidal image data is stored as projection image data in the ROM 602 in consideration of the distortion after projection. In this case, if the trapezoidal image data is projected onto a predetermined portion by the projector unit 1, the image data is projected as a desired rectangular image. Thus, projection image data which become rectangular images in which distortion is corrected when projected onto a projection surface are stored in a storage area, such as the ROM 602, in advance according to projection surfaces (projection portions). The CPU 601 detects that an event that needs maintenance work has occurred in the image forming apparatus 100. Then, the CPU 601 specifies a projection surface according to the kind of the event and the target portion of the maintenance work and acquires projection image data corresponding to the projection surface from the ROM 602 and outputs the projection image data to the projector unit 1. The rectangular image is given for mere illustration; any other kinds of image, for example, characters and figures, can be used in the present disclosure. Correlation among the kinds of event and corresponding portions, projection surfaces, and projection image data may be defined in table form, for example, and may be stored in the ROM 602.

The control unit 300 includes a processing configuration necessary for executing the functions of the image forming apparatus 100 in addition to the configuration shown in FIG. 6B.

Figure 7A:
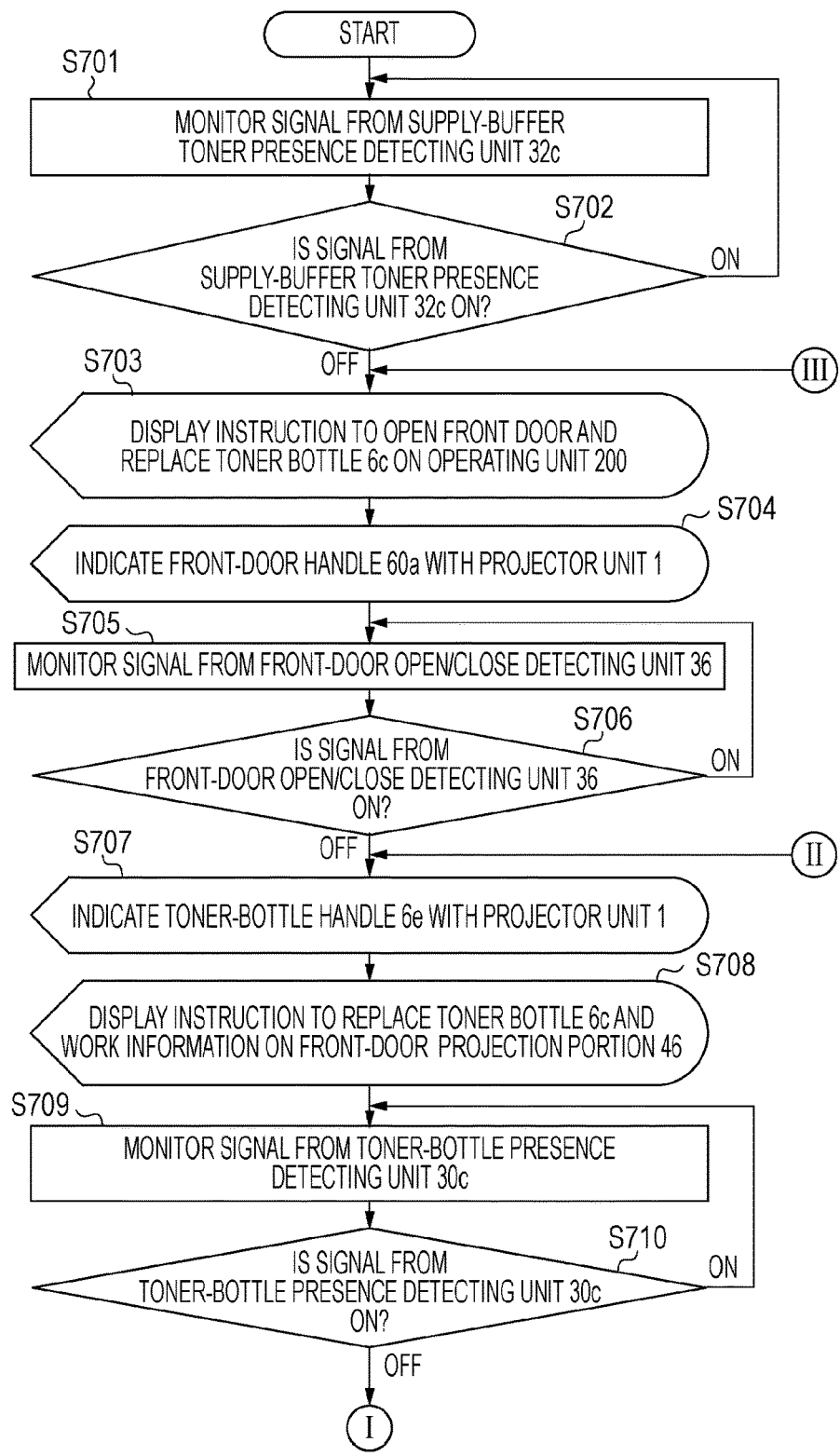
FIG. 7A is a flowchart for a display control process.
Figure 8:
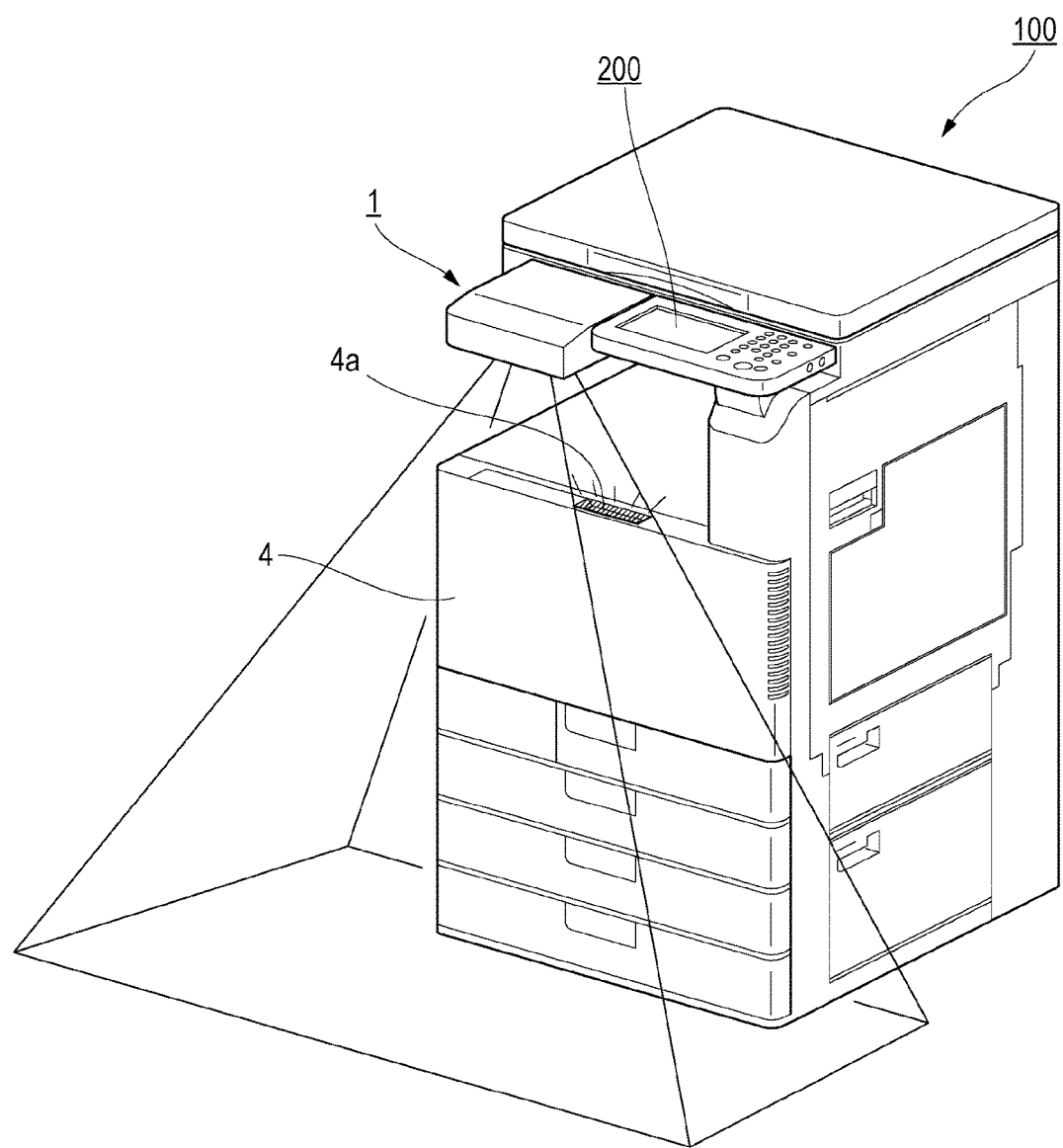
FIG. 8 is a diagram illustrating a state in which an image is projected by the projector unit.

FIGS. 7A and 7B are flowcharts for a display control process when the toner bottle 6c is to be replaced. First, the CPU 601 monitors a signal from the supply-buffer-toner presence detecting unit 32c (S701) while the printer main body 101 is in operation and determines whether the supply-buffer-toner presence detecting unit 32c has detected a predetermined amount of toner based on the signal (S702). If the signal is ON, and it is determined that the supply-buffer-toner presence detecting unit 32c has detected a predetermined amount of toner, the processes from S701 are repeated. In contrast, if the signal is OFF, and it is determined that the supply-buffer-toner presence detecting unit 32c has not detected a predetermined amount of toner (the amount of remaining toner is low), the CPU 601 displays an instruction to open the front door 4 and replace the toner bottle 6c on the operating unit 200 (S703). The front door 4 is a cover of the container of the toner bottles 6a, 6b, 6c, and 6d, which is opened and closed to replace the toner bottles 6a, 6b, 6c, and 6d. The CPU 601 indicates a work portion to the user by selective projection of the front-door handle 4a of the front door 4 with the projector unit 1 (S704). FIG. 8 is a diagram illustrating a state in which an image is selectively projected onto the front-door handle 4a by the projector unit 1. For example, the CPU 601 controls the projector unit 1 so that a predetermined image is aligned with the front-door handle 4a, as illustrated in FIG. 8. As illustrated in FIG. 8, an image is projected so that a portion for which the user needs maintenance work can be identified by the user. This allows the user to recognize a maintenance portion more intuitively.

Figure 9:
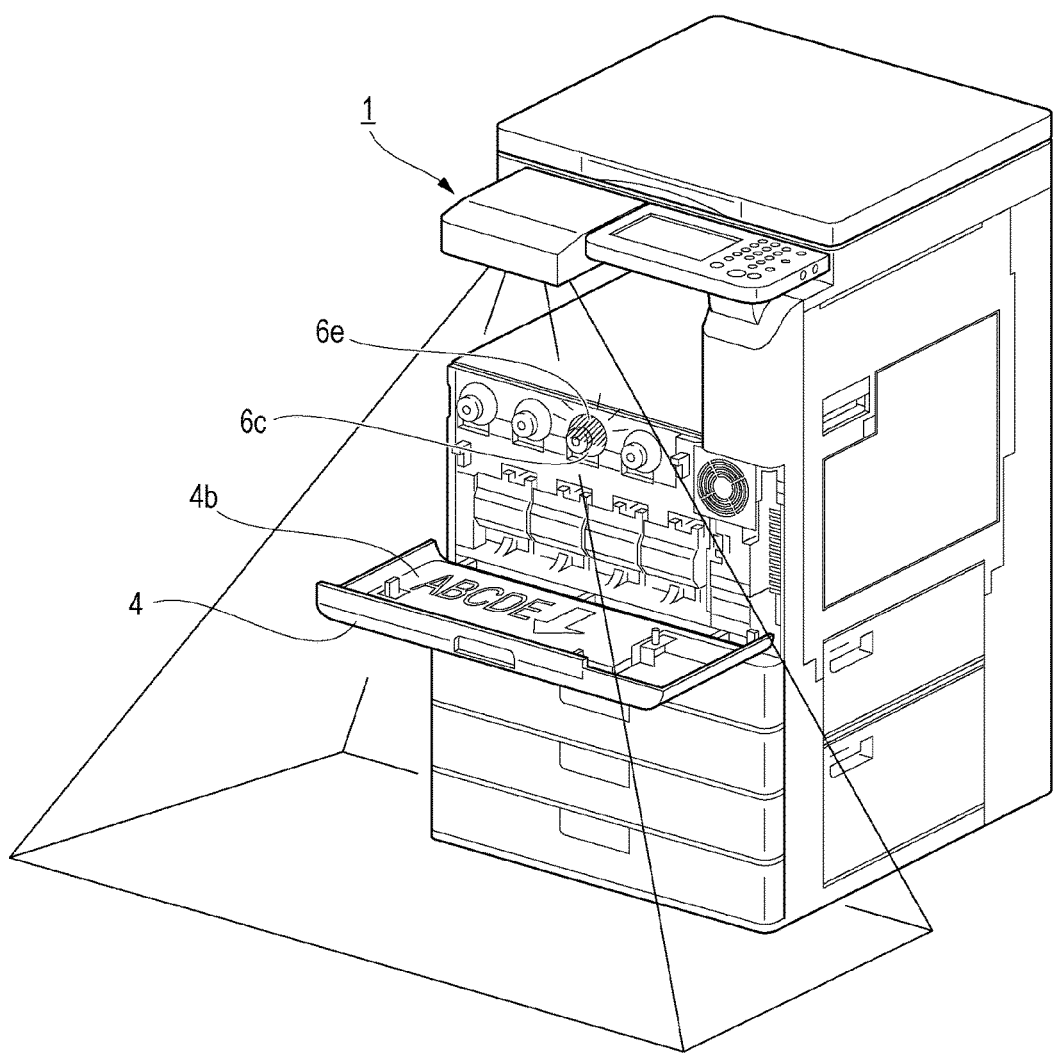
FIG. 9 is a diagram illustrating a state in which an image is projected by the projector unit.

The CPU 601 monitors a signal from the front-door open/close detecting unit 36 (S705) and determines whether the front door 4 is opened based on the signal (S706). If the signal is ON, and it is determined that the front door 4 is not opened, the processes from S705 are repeated. In contrast, if the signal is OFF, and it is determined that the front door 4 is opened, the processes at S707 and S708 are performed. In other words, the CPU 601 switches the projection from the projector unit 1 to selective projection of a handle 6e of the toner bottle 6c (S707) and display of information about the work of replacing the toner bottle 6c (an instruction image) on the front-door projection portion 4b (S708). FIG. 9 is a diagram illustrating a state in which selective projection of the handle 6e of the toner bottle 6c and display of the information on the work of replacing the toner bottle 6c are performed on the front-door projection portion 4b by the projector unit 1. As illustrated in FIG. 9, images (an image projected on the toner bottle 6c and an arrow image on the front-door projection portion 4b) are projected so that the user can identify a portion for which the user needs maintenance work. This allows the user to recognize a maintenance portion more intuitively.

Figure 10:
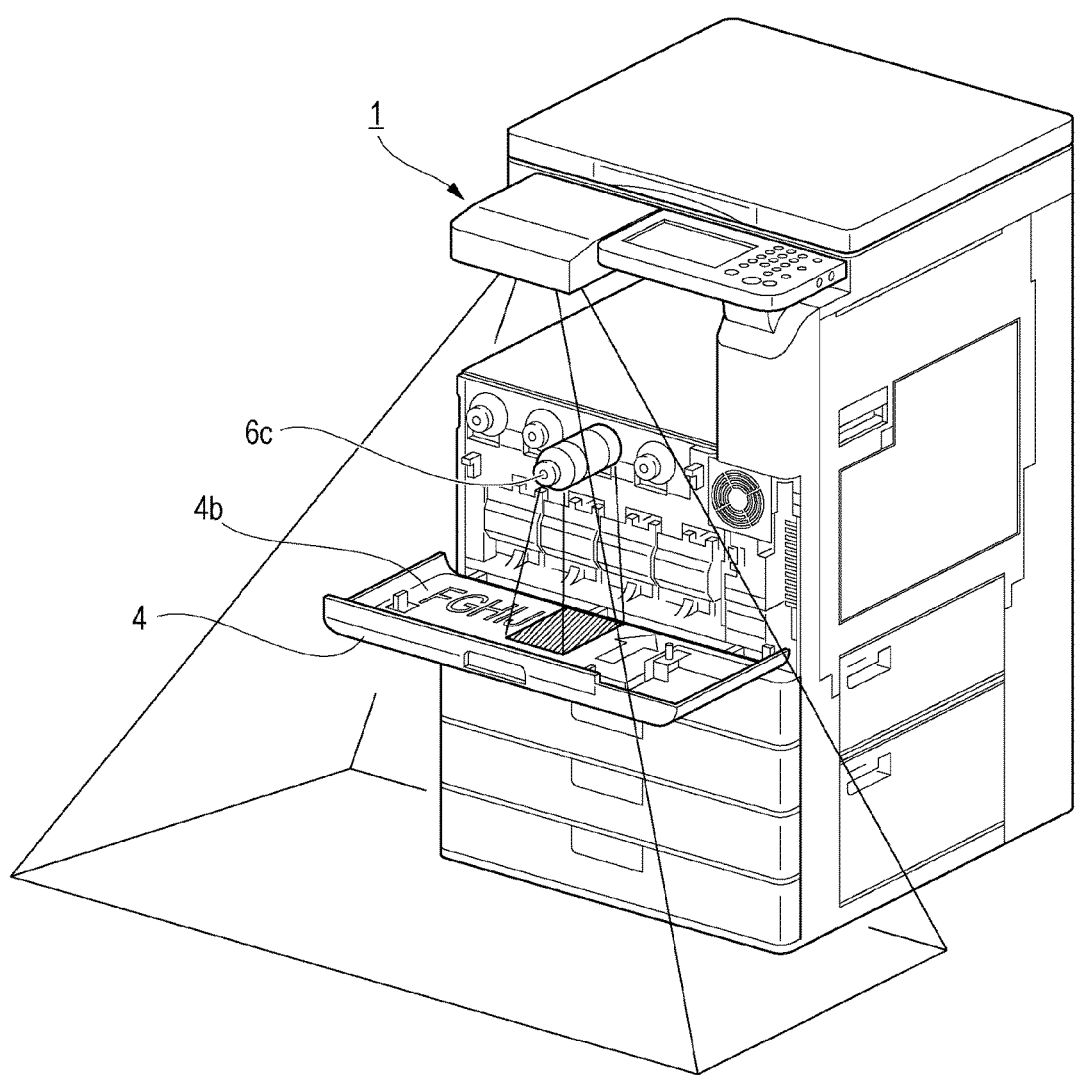
FIG. 10 is a diagram illustrating a state in which an image is projected by the projector unit.

The CPU 601 monitors a signal from the toner-bottle presence detecting unit 30c (S709) and determines whether the toner bottle 6c is drawn out from the printer main body 101 based on the signal (S710). If the signal is ON, and it is determined that the toner bottle 6c has not been drawn out from the printer main body 101, the processes from S709 are repeated. In contrast, if the signal is OFF, and it is determined that the toner bottle 6c has been drawn out from the printer main body 101, the CPU 601 switches the projection from the projector unit 1 onto the front-door projection portion 4b to display of information about the work of replacing the toner bottle 6c with a new toner bottle (S711). FIG. 10 is a diagram illustrating a state in which the information about the work of replacing the toner bottle 6c with a new toner bottle is displayed by the projector unit 1. As illustrated in FIG. 10, work information (an arrow image on the front-door projection portion 4b) is projected on a portion for which the user needs maintenance work. In FIG. 10, the new toner bottle cuts off the projection light to form a shadow, and a backward arrow image is projected in the vicinity of the shadow. This eliminates the need for the user to alternately look at the operating unit 200 and a portion that needs maintenance work, enhancing user work efficiency.

The CPU 601 monitors a signal from the toner-bottle presence detecting unit 30c (S712) and determines whether the used toner bottle 6c has been removed and a new toner bottle 6c has been inserted into a predetermined position in the toner supply unit 102 based on the signal (S713). If the signal is OFF, and it is determined that a new toner bottle 6c has not been inserted into the predetermined position of the toner supply unit 102, the processes from S712 are repeated.

In contrast, if the signal is ON, and it is determined that a new toner bottle 6c has been inserted into the predetermined position of the toner supply unit 102, the CPU 601 monitors a signal from the toner-bottle old/new detecting unit 31c (S714). The CPU 601 determines whether a used toner bottle 6c has been inserted or whether a toner bottle 6a, 6b, or 6d in a different color has been inserted (S715). If the signal is OFF, and it is determined that the used toner bottle 6c has been inserted or that a toner bottle 6a, 6b, or 6d in a different color has been inserted, the processes from S707 are repeated. In contrast, if the signal is ON, and it is determined that a used toner bottle 6c has not been inserted or that a toner bottle 6a, 6b, or 6d in a different color has not been inserted, the CPU 601 switches the projection from the projector unit 1 to an instruction to close the front door 4 (S716). An instruction image (not shown) to instruct to close the front door 4 is projected onto the front-door projection portion 4b.

The CPU 601 monitors a signal from the front-door open/close detecting unit 36 (S717) and determines whether the front door 4 is closed based on the signal (S718). If the signal is OFF, and it is determined that the front door 4 is not closed, the processes from S717 are repeated. In contrast, if the signal is ON, and it is determined that the front door 4 is closed, an operation for supplying toner from the toner bottle 6c is started (S719).

After the supply operation, the CPU 601 monitors a signal from the supply-buffer-toner presence detecting unit 32c (S720) and determines whether toner has been supplied to the toner supply buffer 7c based on the signal (S721). If the signal is OFF, and it is determined that toner has not been supplied to the toner supply buffer 7c, the processes from S703 are repeated. If the signal is ON, and it is determined that toner has been supplied to the toner supply buffer 7c, the process in FIGS. 7A and 7B ends.

With the above configuration, the projector unit 1 is controlled based on the information from the detecting units, so that the user work portion is selectively indicated, and the details of related work are displayed in the vicinity. This configuration allows the user to be clearly notified of the work portion and details of the work of replacing the toner bottle 6c according to the progress of the work. The toner bottle 6c is given for mere illustration; the same operation is performed also for the toner bottles 6a, 6b, and 6d.

Since the configurations of image forming apparatuses according to second and subsequent embodiments are similar to that of the image forming apparatus 100 of the first embodiment, only differences will be described.

Second Embodiment

In this embodiment, the work of replacing the waste-toner container 119 in which a predetermined amount or more of waste toner accumulates will be described as an example of the user maintenance work (user work).

Figure 11:
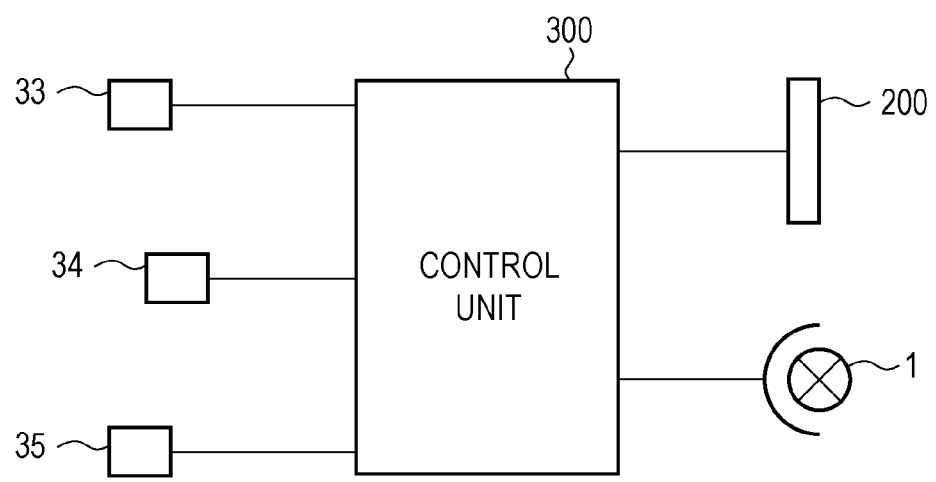
FIG. 11 is a block diagram illustrating the relationship among the control unit, detecting units, and an output unit according to a second embodiment of the present disclosure.

FIG. 11 is a block diagram illustrating the relationship among the control unit 300, detecting units, and an output unit of this embodiment. As illustrated in FIG. 11, the operating unit 200 and the projector unit 1 are connected to the control unit 300. The waste-toner-container fill-up detecting unit 33, the waste-toner-container presence detecting unit 34, and the waste-toner-container-door open/close detecting unit 35 are connected to the control unit 300. The control unit 300 controls information to be displayed with the operating unit 200 and the projector unit 1 based on signals from the detecting units 33 to 35.

Figure 12B:
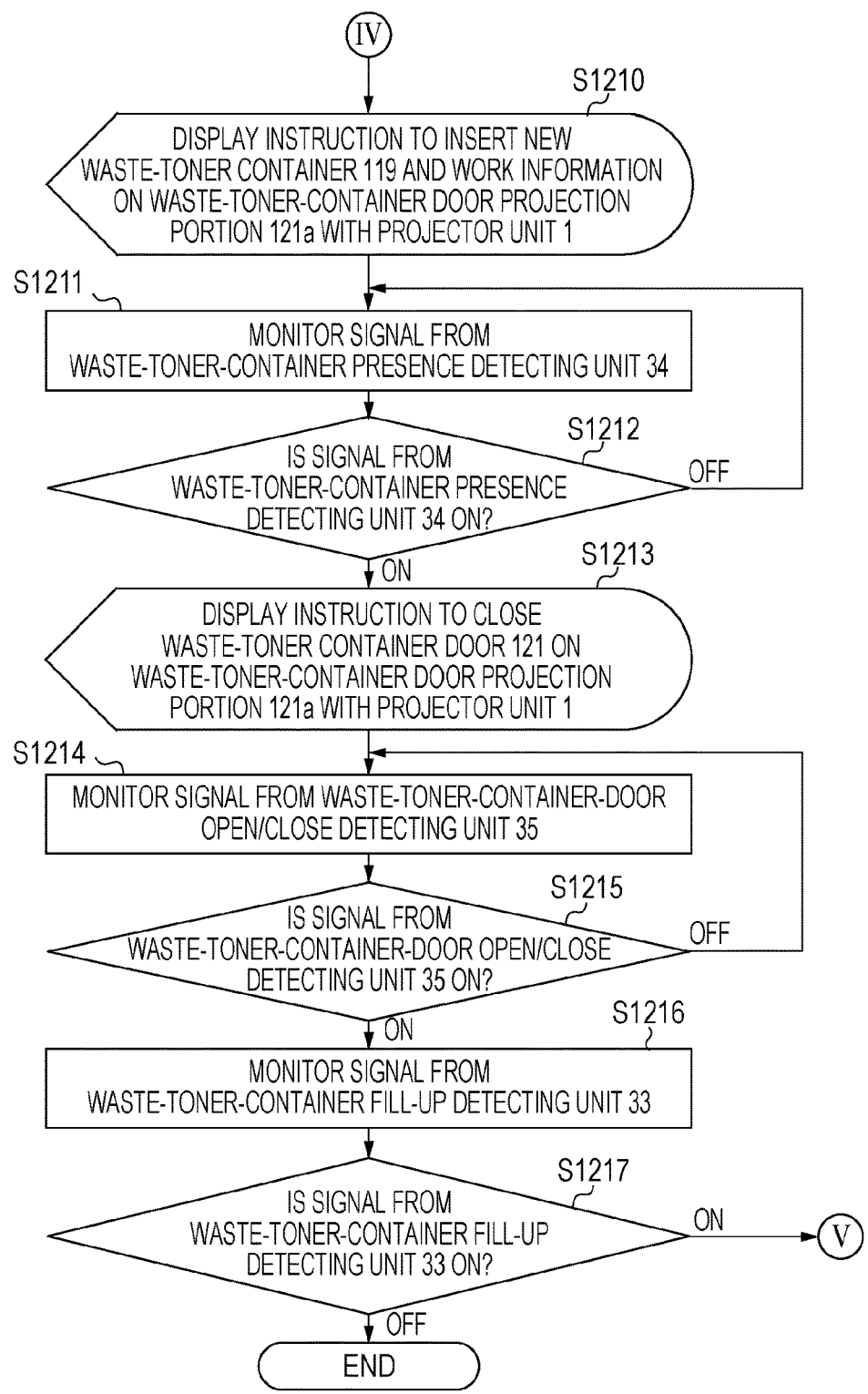
FIG. 12B is a flowchart for the display control process according to the second embodiment.
Figure 13:
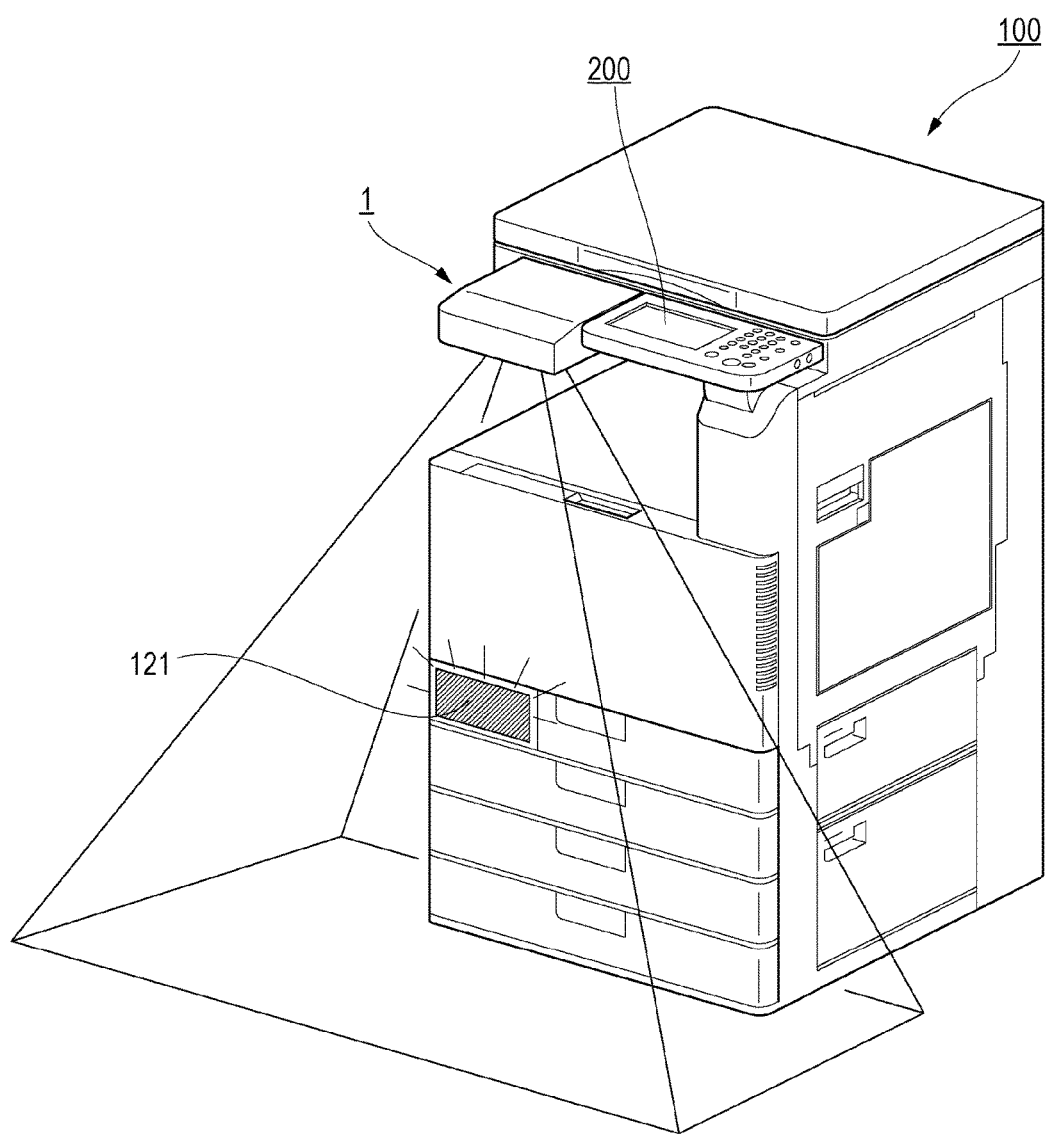
FIG. 13 is a diagram illustrating a state in which an image is projected by the projector unit.

FIGS. 12A and 12B are flowcharts for a display control process when the waste-toner container 119 is to be replaced. First, the CPU 601 monitors a signal from the waste-toner-container fill-up detecting unit 33 while the printer main body 101 is in operation (S1201) and determines whether the amount of waste toner in the waste-toner container 119 exceeds a predetermined amount (S1202). In other words, the CPU 601 determines whether the toner collected into the waste-toner container has reached the predetermined amount. The fact that the collected toner reaches a predetermined value corresponds to an event that needs maintenance work. If the signal if OFF, and it is determined that the amount of toner collected in the waste-toner container 119 does not exceed the predetermined amount, the processes from S1201 are repeated. If the signal is ON, and it is determined that the amount of toner collected in the waste-toner container 119 exceeds the predetermined amount, the processes at S1203 and S1204 are performed. In other words, the CPU 601 displays an instruction to open the waste-toner container door 121 and replace the waste-toner container 119 on the operating unit 200 (S1203) and indicates a work portion to the user by selective projection of the waste-toner container door 121 with the projector unit 1 (S1204). FIG. 13 is a diagram illustrating a state in which selective projection on the waste-toner container door 121 is performed by the projector unit 1. For example, the CPU 601 controls the projector unit 1 so that a predetermined image is aligned with the waste-toner container door 121, as illustrated in FIG. 13. As illustrated in FIG. 13, an image is projected so that the user can identify a portion for which the user needs maintenance work. This allows the user to recognize the maintenance portion more intuitively.

Figure 14:
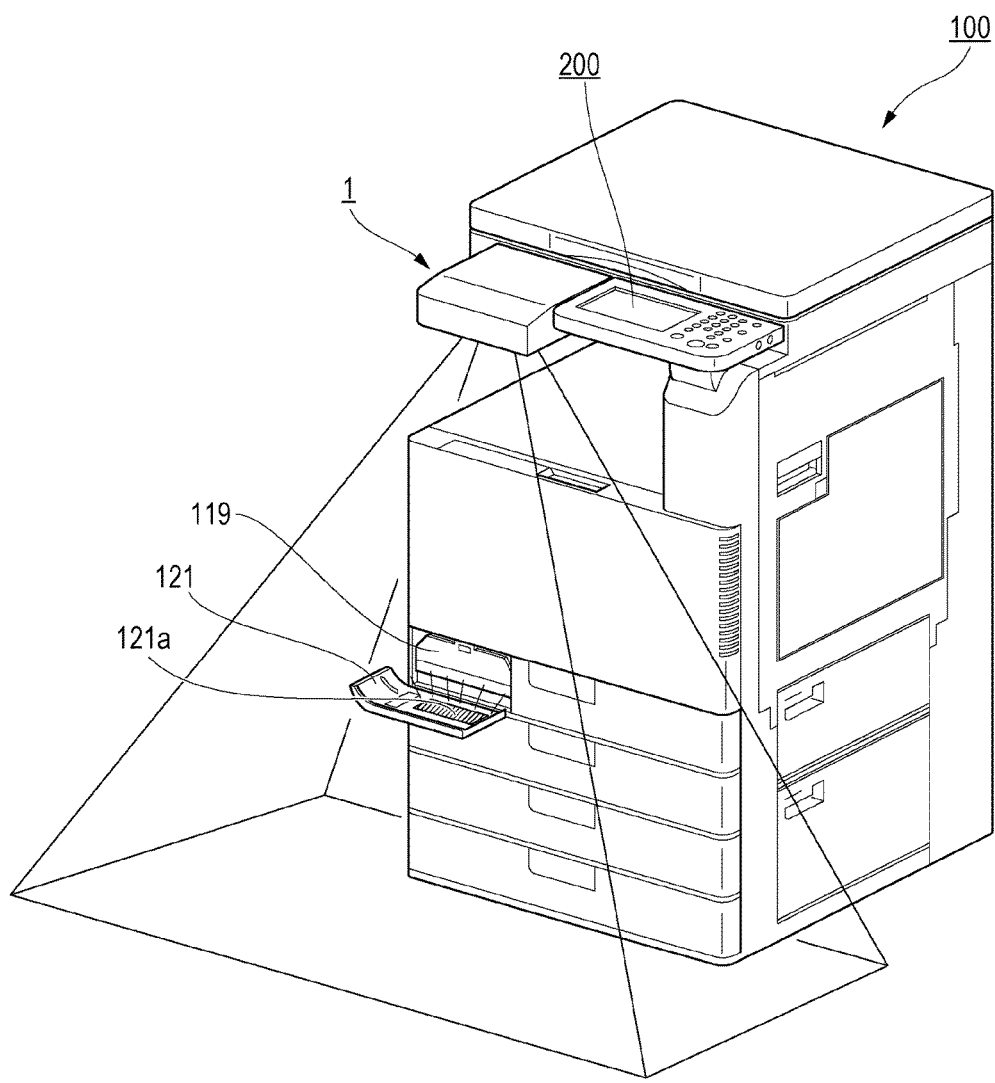
FIG. 14 is a diagram illustrating a state in which an image is projected by the projector unit.

The CPU 601 monitors a signal from the waste-toner-container-door open/close detecting unit 35 (S1205) and determines whether the waste-toner container door 121 is opened based on the signal (S1206). If the signal is ON, and it is determined that the waste-toner container door 121 is not opened, the processes from S1205 are repeated. In contrast, if the signal is OFF, and it is determined that the waste-toner container door 121 is opened, the CPU 601 switches projection from the projector unit 1 to display of an instruction to draw the waste-toner container 119 and work information (S1207). FIG. 14 is a diagram illustrating a state in which an instruction to draw the waste-toner container 119 and work information are projected. As illustrated in FIG. 14, work information (a gray portion on the waste-toner container door 121) is projected onto a portion for which the user needs maintenance work. Although it is displayed in gray in FIG. 14, the work information, such as an instruction for drawing, can be displayed in text or figure. This eliminates the need for the user to alternately look at the operating unit 200 and a portion that needs maintenance work, enhancing user work efficiency.

Figure 15:
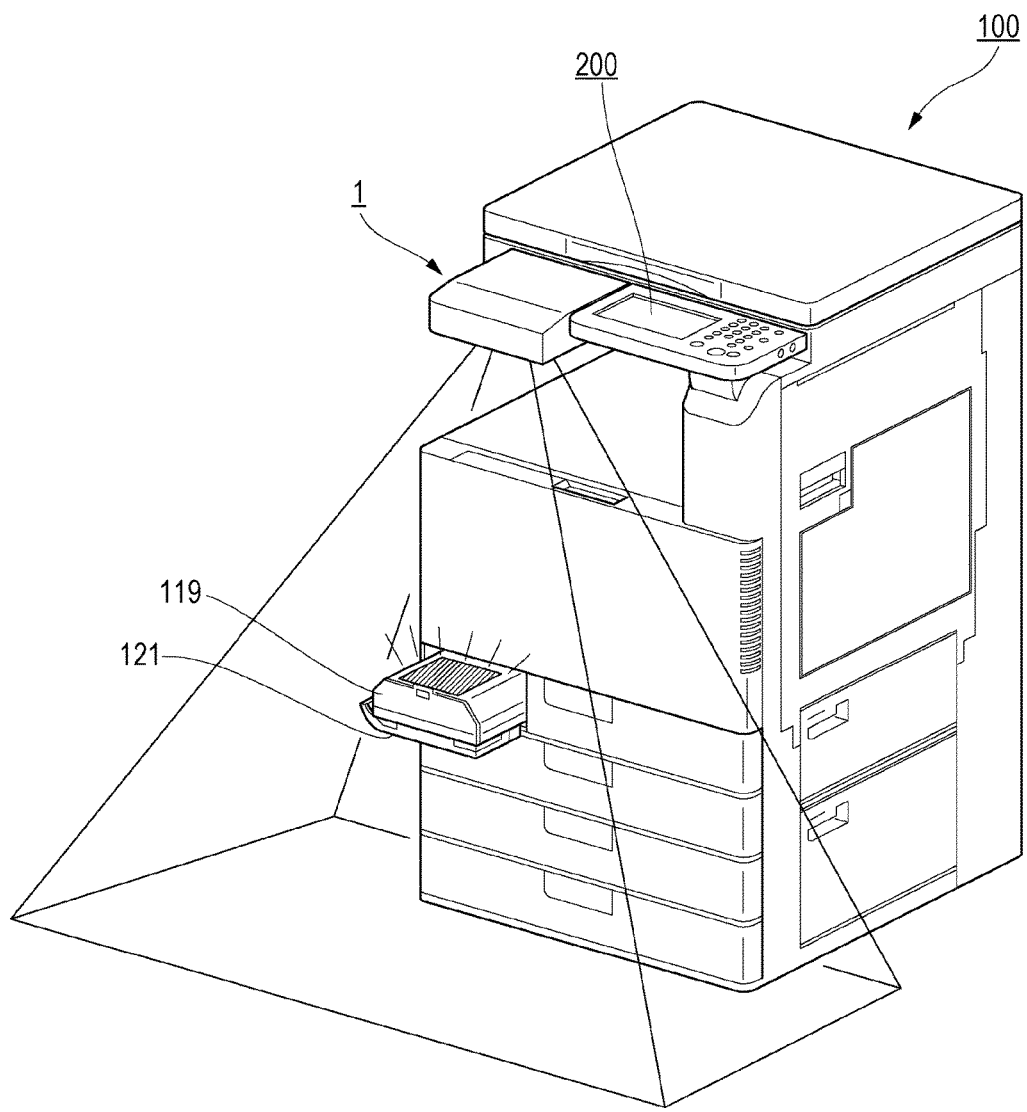
FIG. 15 is a diagram illustrating a state in which an image is projected by the projector unit.

The CPU 601 monitors a signal from the waste-toner-container presence detecting unit 34 (S1208) and determines whether the waste-toner container 119 is drawn out by the user based on the signal (S1209). If the signal is ON, and it is determined that the waste-toner container 119 is not drawn out, the processes from S1208 are repeated. In contrast, if the signal is OFF, and it is determined that the waste-toner container 119 is drawn out, the CPU 601 switches projection to the waste-toner-container-door projection portion 121a from the projector unit 1 to display of information about the work of replacing the waste-toner container 119 with a new waste-toner container 119 (S1210). FIG. 15 is a diagram illustrating a state in which an instruction to replace the waste-toner container 119 with a new waste-toner container 119 is projected by the projector unit 1. As illustrated in FIG. 15, work information (a gray portion on the waste-toner container 119) is projected to a portion for which the user needs maintenance work. Although it is displayed in gray in FIG. 15, the work information, such as an instruction for replacement, can be displayed in text or figure. This eliminates the need for the user to alternately look at the operating unit 200 and a portion that needs maintenance work, enhancing user work efficiency.

The CPU 601 monitors a signal from the waste-toner-container presence detecting unit 34 (S1211) and determines whether an empty waste-toner container 119 is inserted based on the signal (S1212). If the signal is OFF, and it is determined that an empty waste-toner container 119 is not inserted, the processes from S1211 are repeated. In contrast, if the signal is ON, and it is determined that an empty waste-toner container 119 is inserted, the CPU 601 switches projection to the waste-toner-container-door projection portion 121a from the projector unit 1 to display of information about the work of closing the waste-toner container door 121 (S1213). The projection state is the same as the state illustrated in FIG. 14.

The CPU 601 monitors a signal from the waste-toner-container-door open/close detecting unit 35 (S1214) and determines whether the waste-toner container door 121 is closed based on the signal (S1215). If the signal is OFF, and it is determined that the waste-toner container door 121 is not closed, the processes from S1214 are repeated. In contrast, if the signal is ON, and it is determined that the waste-toner container door 121 is closed, the CPU 601 monitors a signal from the waste-toner-container fill-up detecting unit 33 (S1216). Then, the CPU 601 determines whether the amount of toner collected in the waste-toner container 119 exceeds a predetermined amount based on the signal (S1217). If the signal is ON, and it is determined that the amount of toner collected exceeds the predetermined amount, the processes from S1203 are repeated. In contrast, if the signal is OFF, and it is determined that the amount of toner collected does not exceed the predetermined amount, the process in FIGS. 12A and 12B ends.

With the above configuration, the projector unit 1 is controlled based on the information from the detecting units, so that the user work portion is selectively indicated, and the details of related work are displayed in the vicinity. This configuration allows the user to be clearly notified of the work portion and the details of the work of replacing the waste-toner container 119 according to the progress of the work.

Third Embodiment

In this embodiment, a sheet supply operation when the sheets S in the sheet container 11b run out will be described as an example of the user maintenance work (user work).

Figure 16:
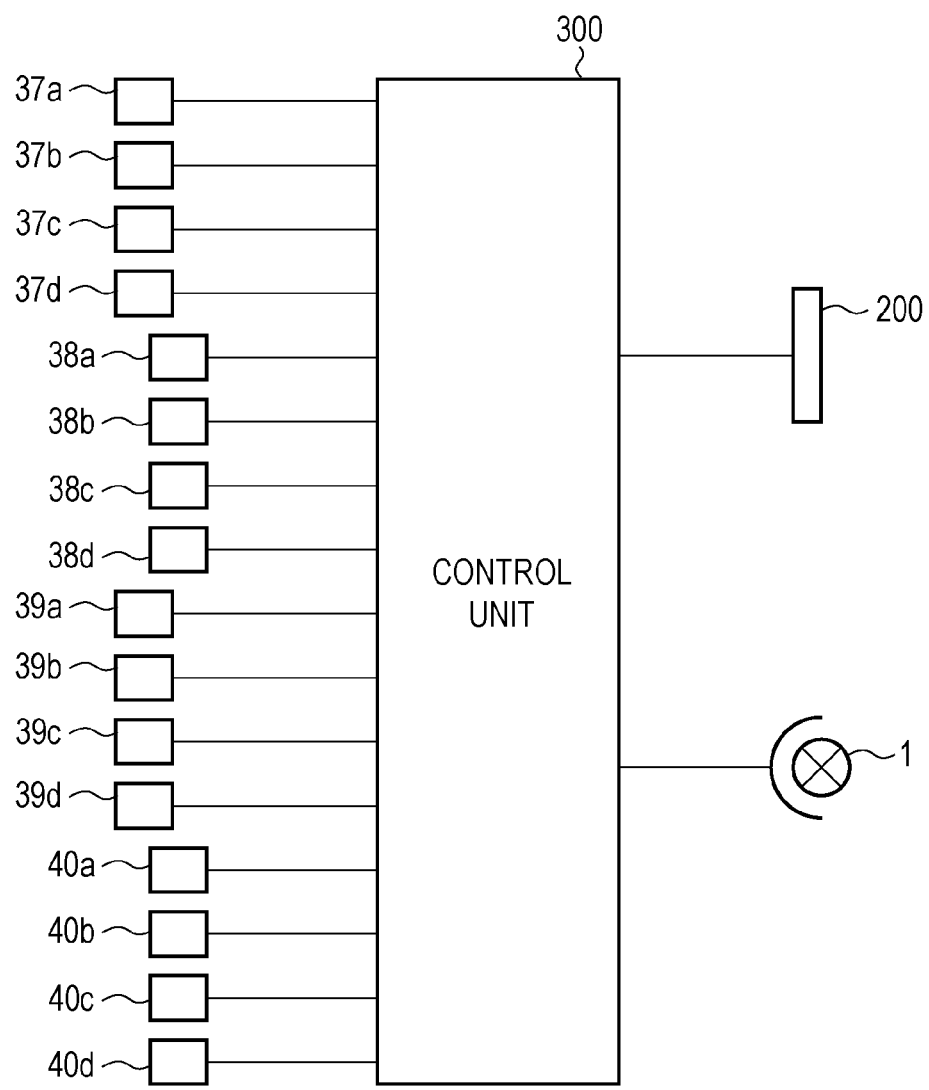
FIG. 16 is a block diagram illustrating the relationship among the control unit, detecting units, and an output unit according to a third embodiment of the present disclosure.

FIG. 16 is a block diagram illustrating the relationship among the control unit 300, detecting units, and an output unit of this embodiment. As illustrated in FIG. 16, the operating unit 200 and the projector unit 1 are connected to the control unit 300. The sheet-container sheet-presence detecting units 37a, 37b, 37c, and 37d and the sheet-container sheet-size detecting units 38a, 38b, 38c, and 38d are connected to the control unit 300. The sheet-container open/close detecting unit 39a, 39b, 39c, and 39d and the sheet-container position detecting units 40a, 40b, 40c, and 40d are also connected to the control unit 300. The control unit 300 controls information to be displayed with the operating unit 200 and the projector unit 1 based on information from the individual detecting units.

Figure 17A:
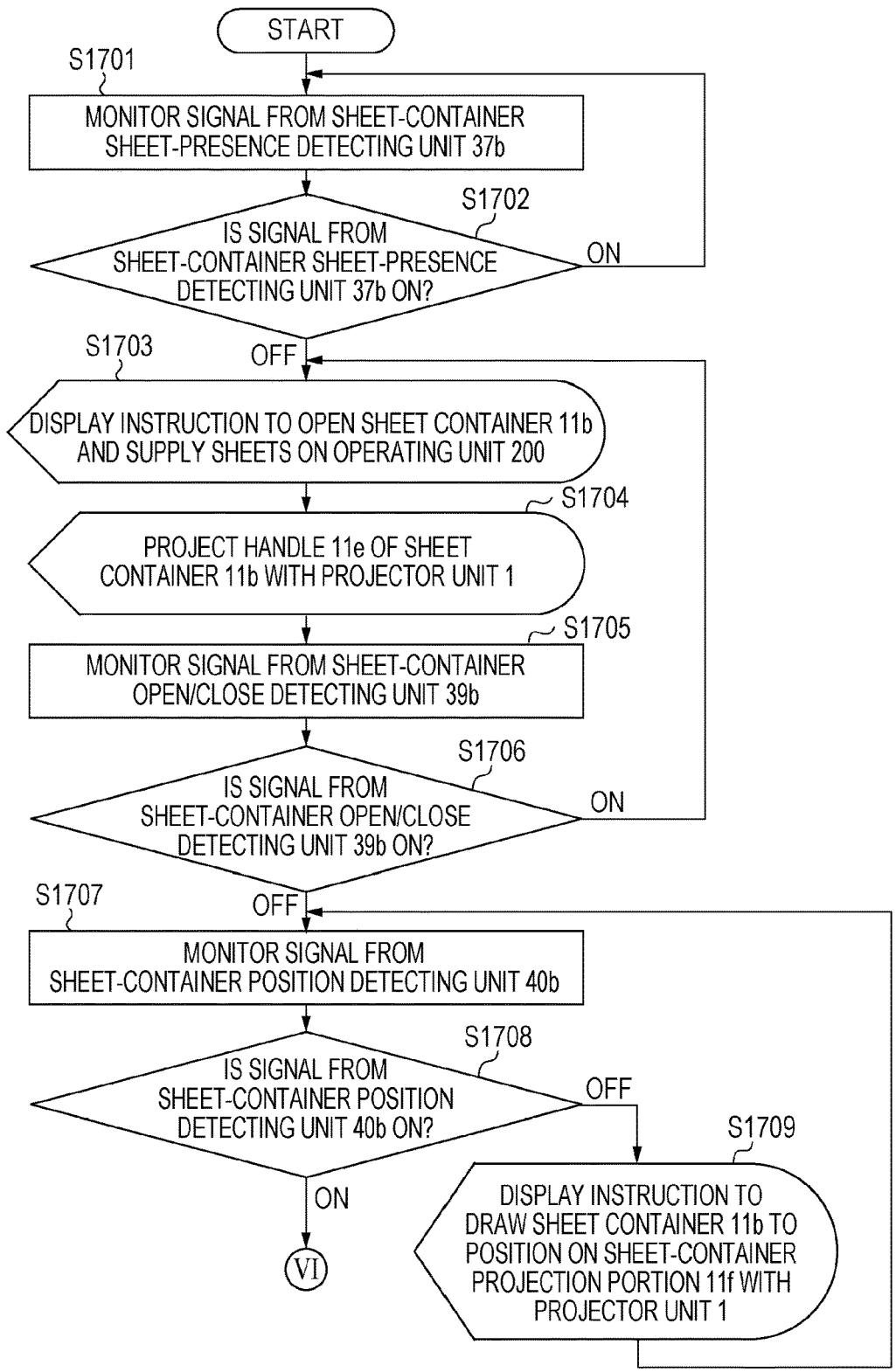
FIG. 17A is a flowchart for a display control process according to the third embodiment.
Figure 18:
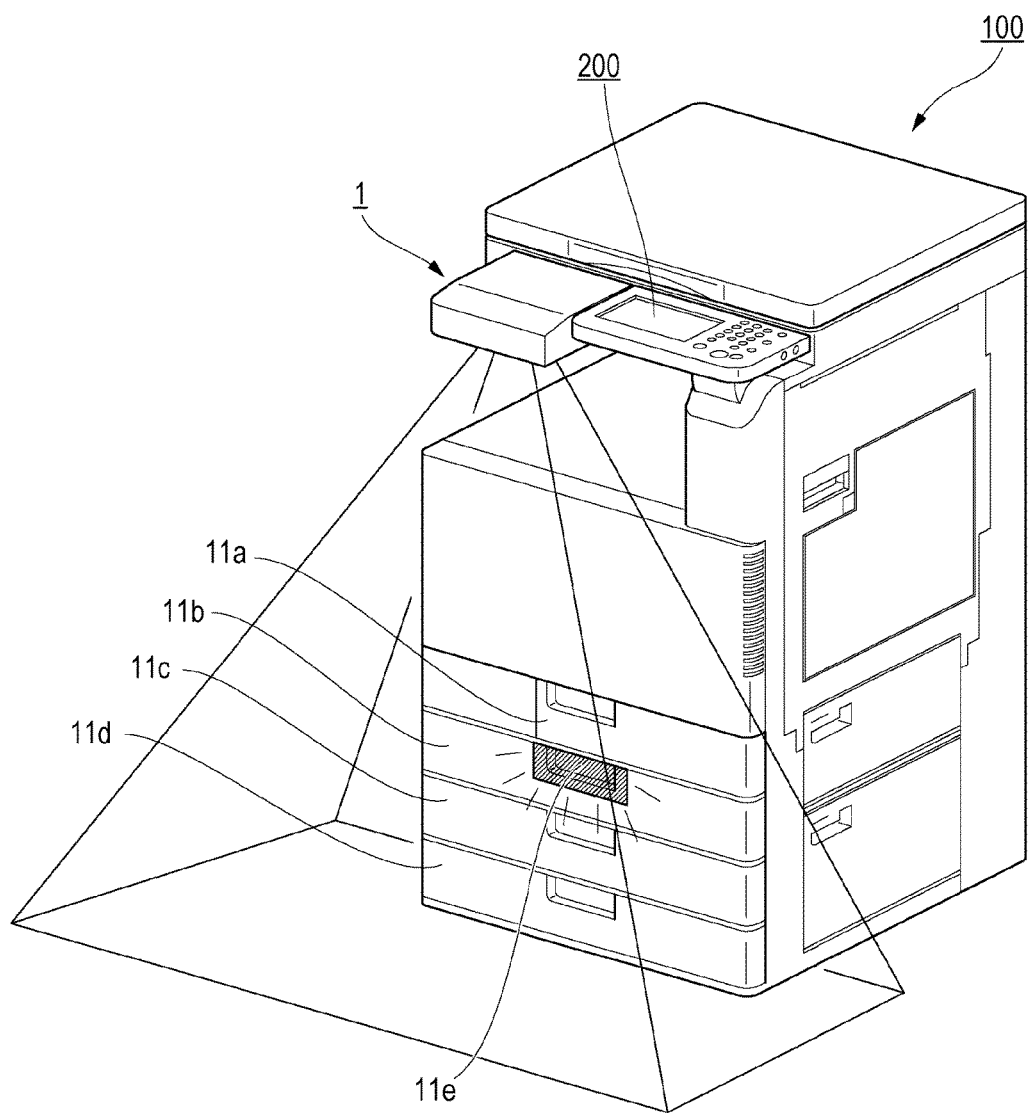
FIG. 18 is a diagram illustrating a state in which an image is projected by the projector unit.

FIGS. 17A and 17B are flowcharts for display control for a sheet supply operation when the sheets S in the sheet container 11b run out. First, the CPU 601 monitors a signal from the sheet-container sheet-presence detecting unit 37b while the printer main body 101 is in operation (during printing) (S1701) and determines whether the sheets S in the sheet container 11b have run out based on the signal (S1702). In other words, running out of sheets is detected by determining whether the sheets S in the sheet container 11b have run out. The running out of sheets corresponds to an event that needs maintenance work. If the signal is ON, and it is determined that the sheets S in the sheet container 11b have not run out, the processes from S1701 are repeated. In contrast, if the signal is OFF, and it is determined that the sheets S in the sheet container 11b have run out, the processes at S1703 and S1704 are performed. In other words, the CPU 601 displays an instruction to open the sheet container 11b and supply sheets S to the sheet container 11b on the operating unit 200 (S1703), and indicates the work portion to the user by selective projection of the sheet container 11b with the projector unit 1 (S1704). FIG. 18 is a diagram illustrating a state in which an image is selectively projected onto the sheet container 11b by the projector unit 1. For example, the CPU 601 controls the projector unit 1 so that a predetermined image is aligned with part of the sheet container 11b, as illustrated in FIG. 18. As illustrated in FIG. 18, an image is projected so that a portion for which the user needs maintenance work can be identified by the user. This allows the user to recognize a maintenance portion more intuitively.

Figure 19:
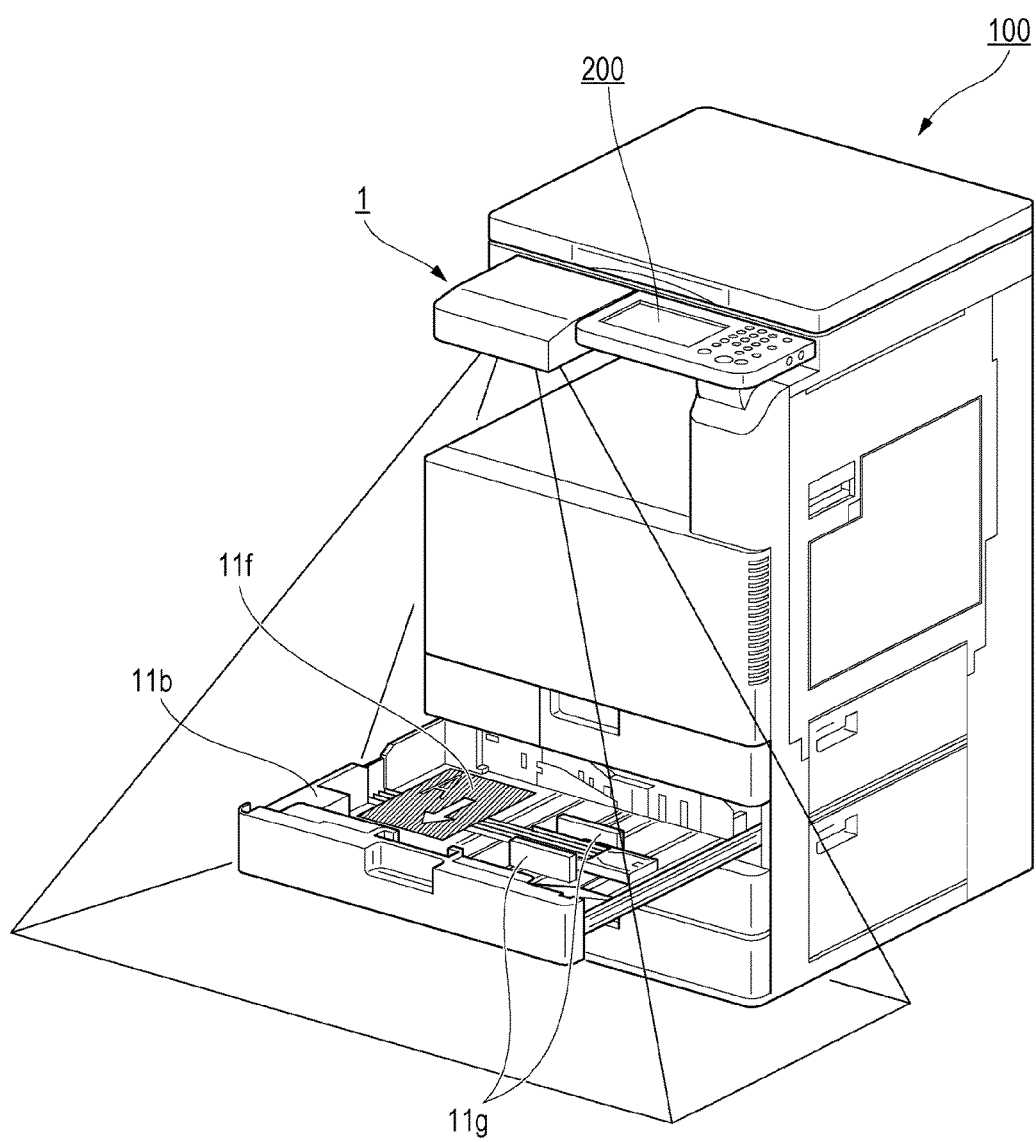
FIG. 19 is a diagram illustrating a state in which an image is projected by the projector unit.

The CPU 601 monitors a signal from the sheet-container open/close detecting unit 39b (S1705) and determines whether the sheet container 11b is opened by the user based on the signal (S1706). If the signal is ON, and it is determined that the sheet container 11b is not opened, the processes from S1703 are repeated. In contrast, if the signal is OFF, and it is determined that the sheet container 11b is opened, the processes at S1707 and S1708 are performed. In other words, the CPU 601 monitors a signal from the sheet-container position detecting unit 40b (S1707) and determines whether the sheet container 11b is drawn to a predetermined position based on the signal (S1708). If the signal is OFF, and it is determined that the sheet container 11b is not drawn to a predetermined position, the process at S1709 is performed. In other words, the CPU 601 displays information about the work of drawing the sheet container 11b using the projector unit 1 so that the sheet container 11b is drawn to a predetermined position (S1709). FIG. 19 is a diagram illustrating a state in which the information about the work of drawing the sheet container 11b is displayed by the projector unit 1. As illustrated in FIG. 19, the work information (an image of an arrow on the sheet container 11b) is projected to a portion for which the user needs maintenance work. This eliminates the need for the user to alternately look at the operating unit 200 and a portion that needs maintenance work, enhancing user work efficiency.

Figure 20:
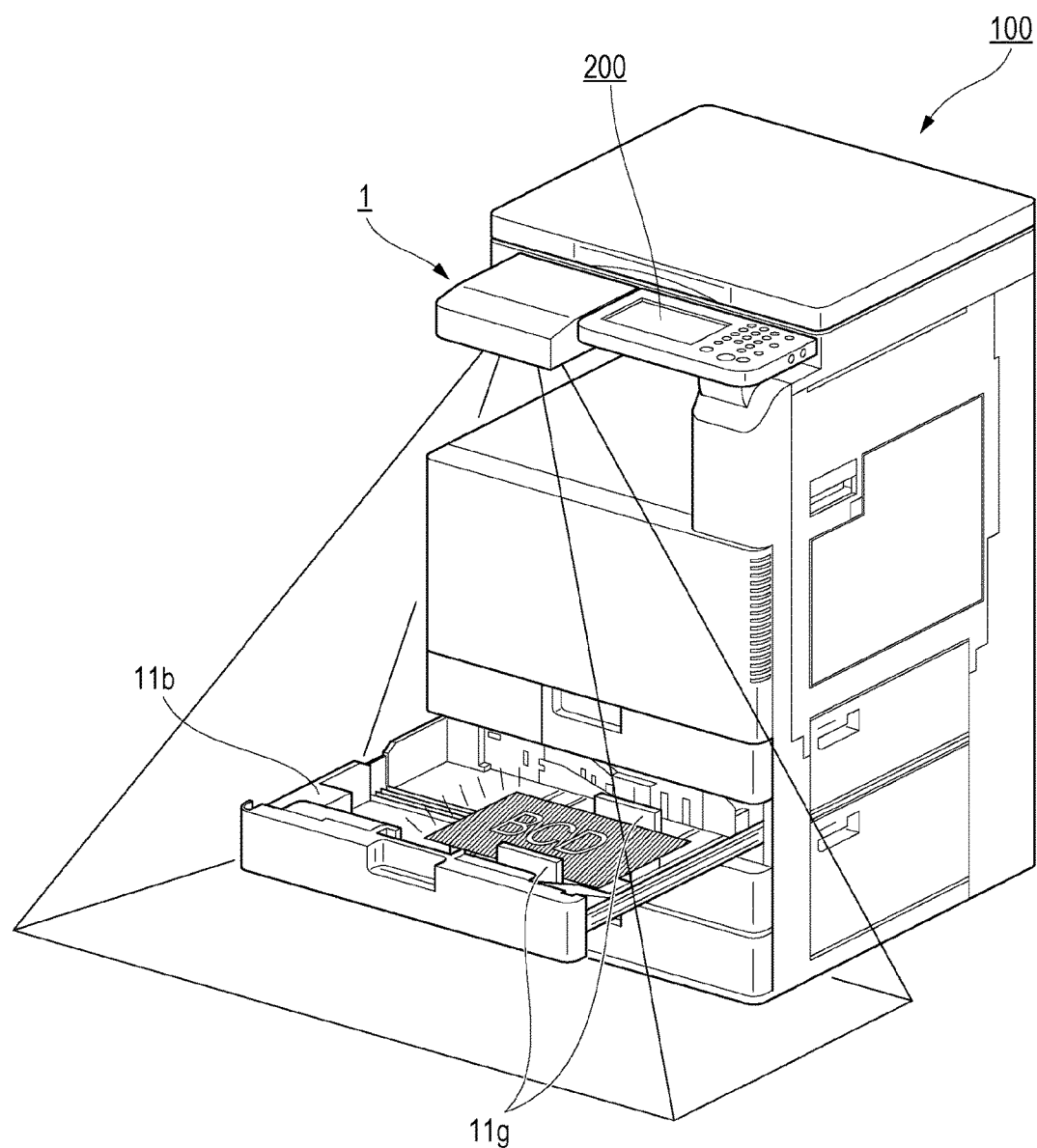
FIG. 20 is a diagram illustrating a state in which an image is projected by the projector unit.

In contrast, if the signal is ON, and it is determined that the sheet container 11b is drawn to a predetermined position, the CPU 601 switches the projection from the projector unit 1 to information on the load position of supply sheets S (S1710). FIG. 20 is a diagram illustrating a state in which the information on the load position of supply sheets S is projected by the projector unit 1. As illustrated in FIG. 20, work information (a gray portion on the sheet container 11b) is projected onto a portion for which the user needs maintenance work. Although it is displayed in gray in FIG. 20, the work information, such as an instruction to load sheets S, can be displayed in text or figure. This eliminates the need for the user to alternately look at the operating unit 200 and a portion that needs maintenance work, enhancing user work efficiency.

The CPU 601 monitors a signal from the sheet-container sheet-presence detecting unit 37b (S1711) and determines whether sheets S are supplied to the sheet container 11b based on the signal (S1712). If the signal is OFF, and it is determined that the sheet container 11b is not supplied with sheets S, the processes from S1710 are repeated. In contrast, if the signal is ON, and it is determined that the sheet container 11b is supplied with sheets S, the process at S1713 is performed. In other words, to determine the position and size of the sheets S, the CPU 601 instructs the user on the set position of the sheet-container sheet guides 11g and work information by projection with the projector unit 1 (S1713). The projection state is the same as the state illustrated in FIG. 20.

The CPU 601 monitors a signal from the sheet-container sheet-size detecting unit 38b (S1714) and determines whether the position of the sheet-container sheet guides 11g is set to the set sheet size based on the signal (S1715). If it is determined that the position of the sheet-container sheet guides 11g is not set to the set sheet size, the processes from S1713 are repeated. In contrast, if it is determined that the position of the sheet-container sheet guides 11g is set to the set sheet size, the CPU 601 switches the projection from the projector unit 1 to an instruction to close the sheet container 11b and work information (S1716). The projection state is the same as the state illustrated in FIG. 20. The instruction to close the sheet container 11b is given by, for example, projecting a backward arrow onto the sheet container 11b.

The CPU 601 monitors a signal from the sheet-container open/close detecting unit 39b (S1717) and determines whether the sheet container 11b is closed by the user based on the signal (S1718). If the signal is OFF, and it is determined that the sheet container 11b is not closed, the processes from S1716 are repeated. In contrast, if the signal is ON, and it is determined that the sheet container 11b is closed, the process in FIGS. 17A and 17B ends.

In this embodiment, a signal from the sheet-container sheet-size detecting unit 38b is monitored before the sheet container 11b is closed. If transmission of the signal from the sheet-container sheet-size detecting unit 38b is disabled when the sheet containers 11 is opened, the configuration may be changed as appropriate. For example, the closing operation may be performed after an instruction to load sheets S and a sheet load position are displayed on the sheet container 11b by the projector unit 1 (after S1710). The CPU 601 may monitor signals from the sheet-container sheet-presence detecting unit 37b and the sheet-container sheet-size detecting unit 38b after the sheet-container open/close detecting unit 39b confirms that the sheet container 11b is closed. In this case, if it is determined that the position of the sheet-container sheet guides 11g is set to the set sheet size, the process in FIGS. 17A and 17B ends, and if not, the process at S1703 for displaying an instruction to supply sheets S and the subsequent processes are repeated. Thus, the sequence in which the CPU 601 acquires work information to be detected may be changed as appropriate.

With the above configuration, the projector unit 1 is controlled based on the information from the detecting units, so that the user work portion is selectively indicated, and the details of related work are displayed in the vicinity. This configuration allows the user to be clearly notified of the work portion and the details of the work of supplying sheets S to the sheet container 11b according to the progress of the work. The sheet container 11b is given for mere illustration; the same operation is performed also for the sheet containers 11a, 11c, and 11d.

Fourth Embodiment

In this embodiment, the work of supplying sheets S from the manual feeding unit 104 will be described as an example of the user maintenance work (user work).

Figure 21:
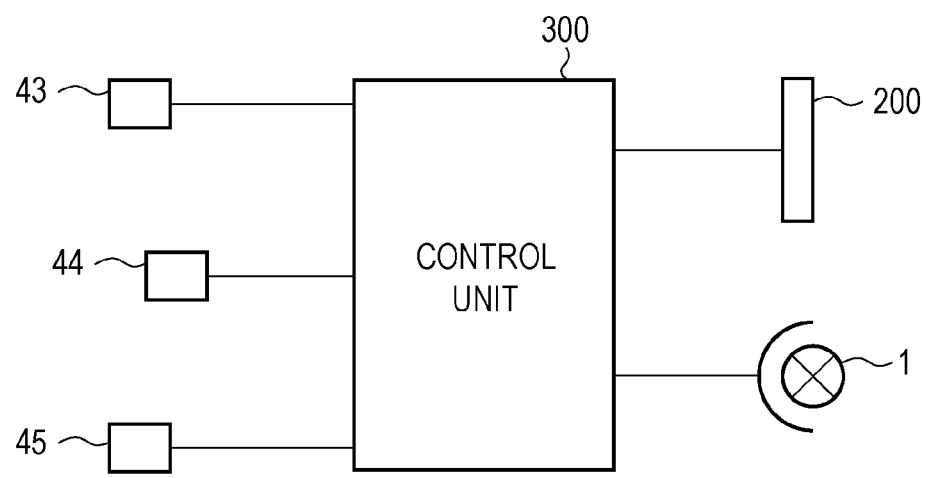
FIG. 21 is a block diagram illustrating the relationship among the control unit, detecting units, and an output unit according to a fourth embodiment of the present disclosure.

FIG. 21 is a block diagram illustrating the relationship among the control unit 300, detecting units, and an output unit of this embodiment. As illustrated in FIG. 21, the operating unit 200 and the projector unit 1 are connected to the control unit 300. The sheet-feed-tray open/close detecting unit 43, the sheet-feed-tray sheet-presence detecting unit 44, and the sheet-feed-tray sheet-size detecting unit 45 are connected to the control unit 300. The control unit 300 controls information to be displayed with the operating unit 200 and the projector unit 1 based on signals from the detecting units 43 to 45.

Figure 22A:
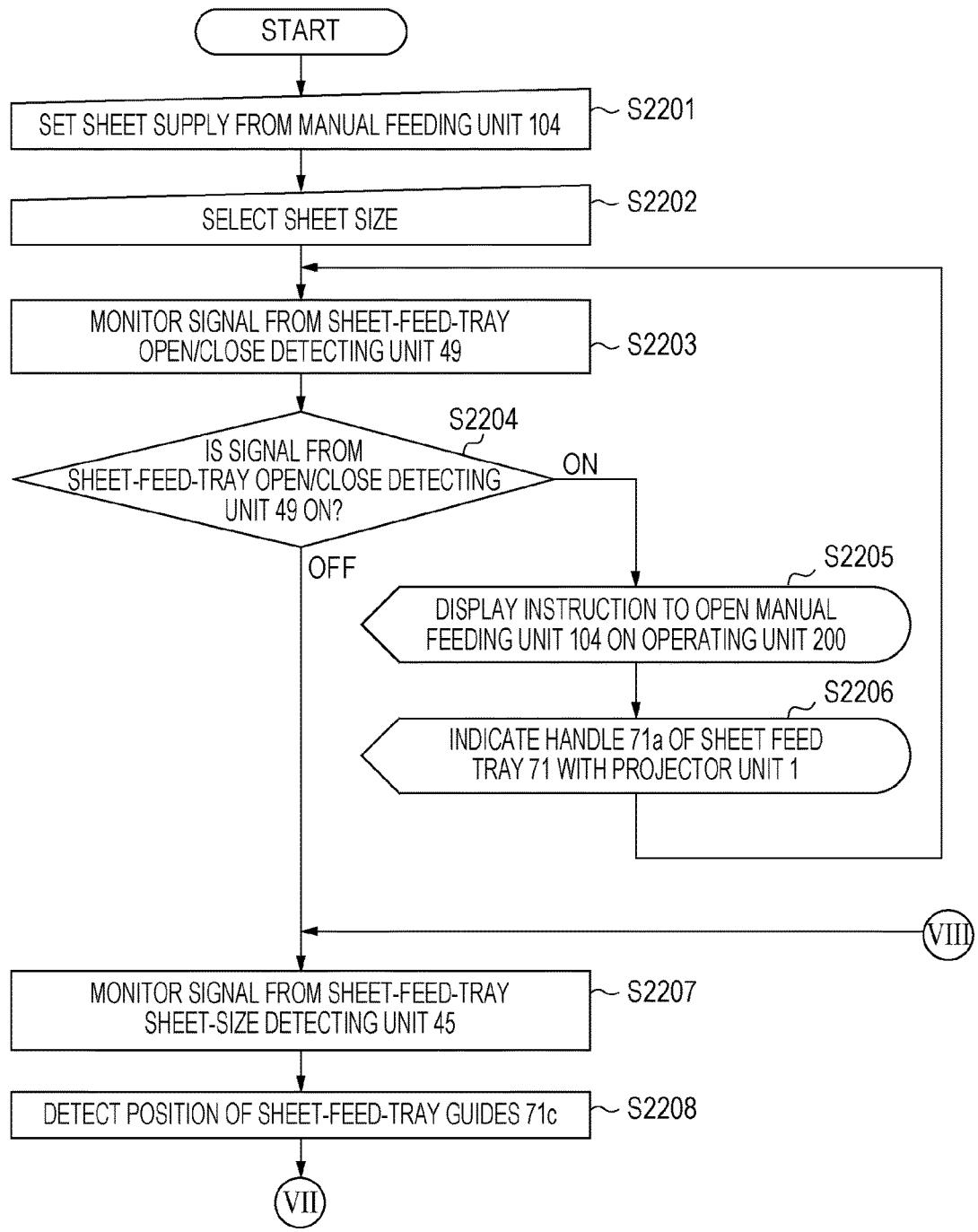
FIG. 22A is a flowchart for a display control process according to the fourth embodiment.
Figure 22B:
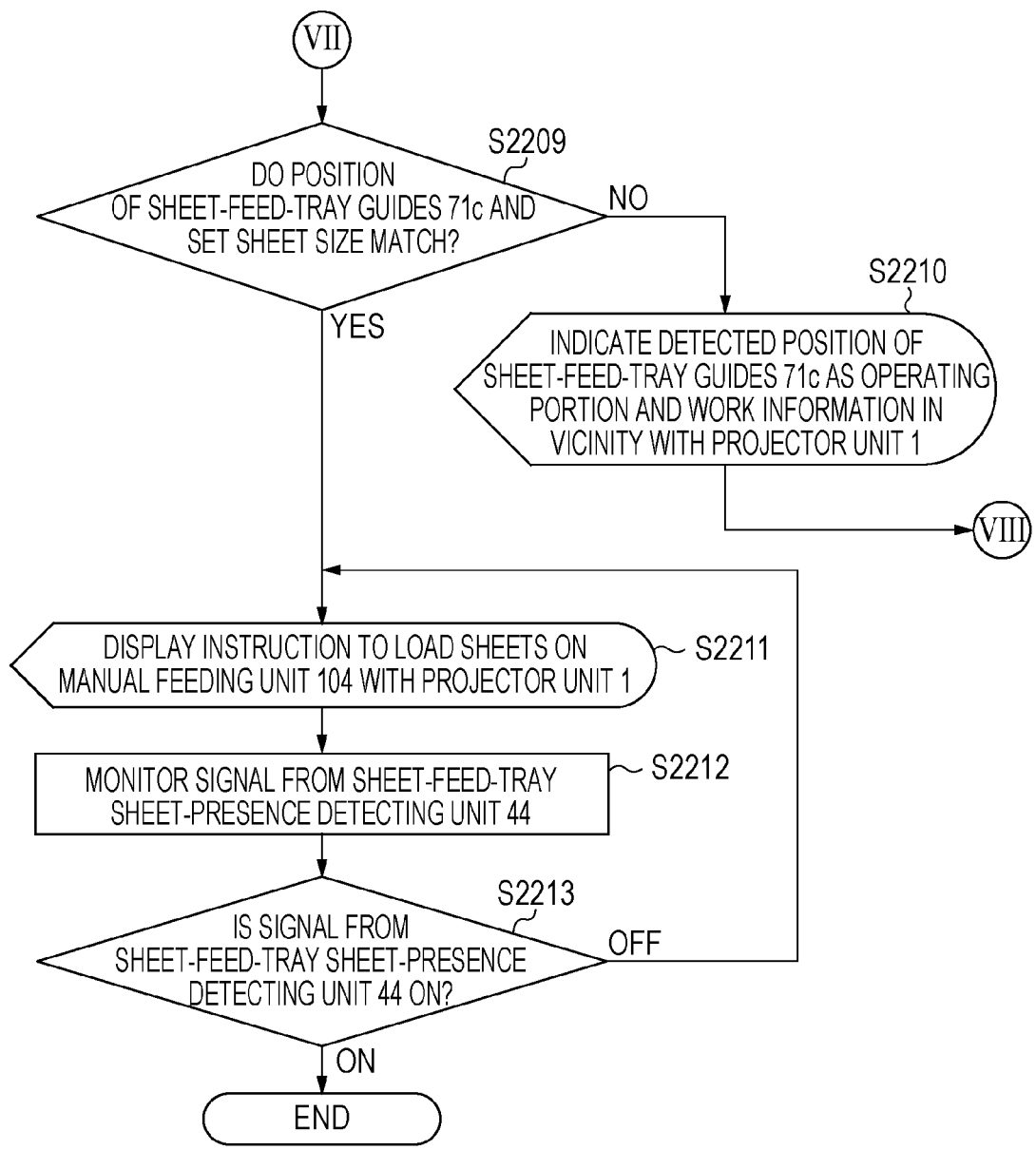
FIG. 22B is a flowchart for the display control process according to the fourth embodiment.

FIGS. 22A and 22B are flowcharts for a display control process when sheets S are to be supplied from the manual feeding unit 104. First, the CPU 601 accepts the setting of supplying sheets S from the manual feeding unit 104 on the operating unit 200 (S2201) and accepts the setting of sheet size (S2202).

Figure 23:
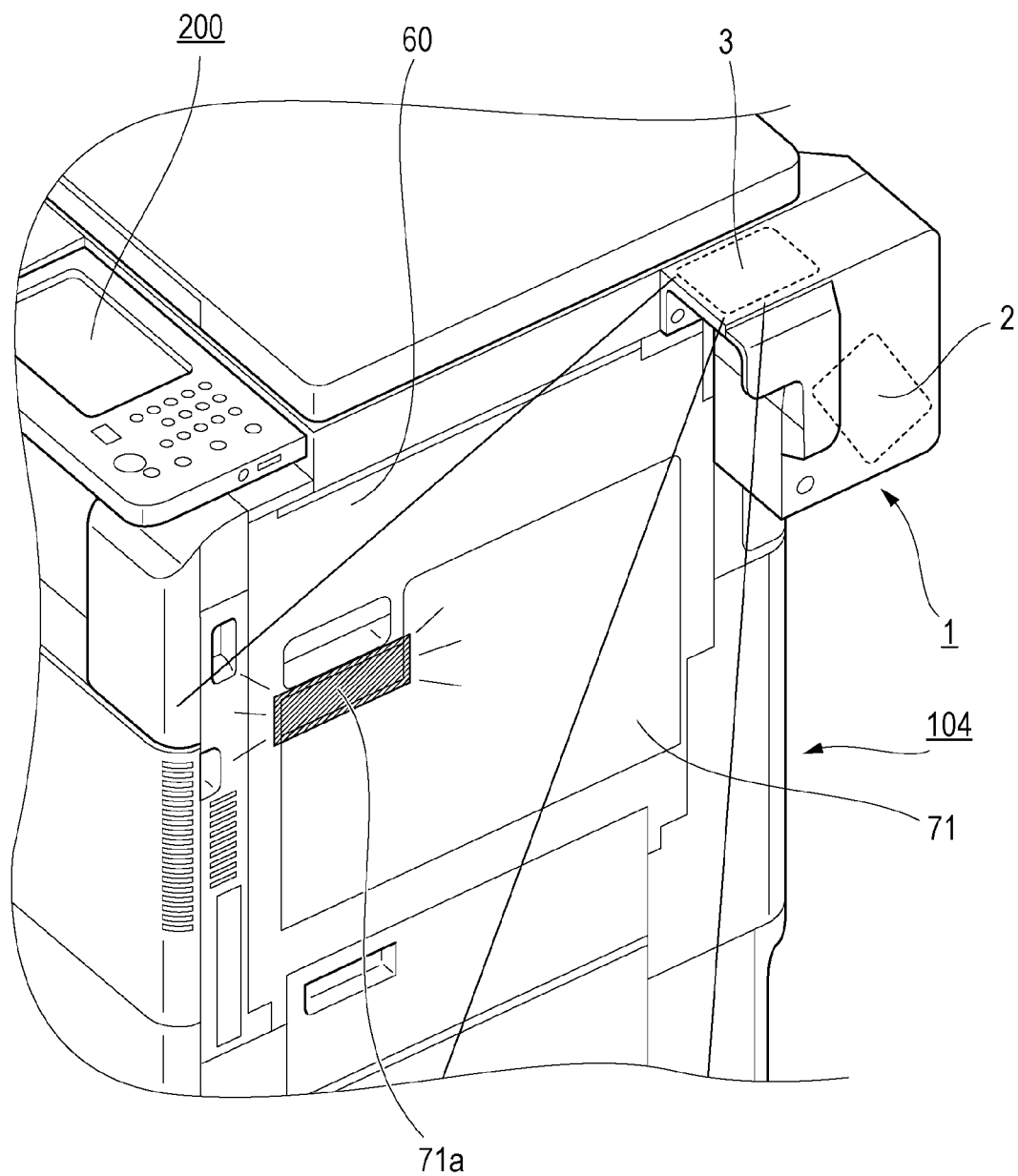
FIG. 23 is a diagram illustrating a state in which an image is projected by the projector unit.

The CPU 601 monitors a signal from the sheet-feed-tray open/close detecting unit 49 (S2203) and determines whether the manual feeding unit 104 is opened based on the signal (S2204). If the signal is ON, and it is determined that the manual feeding unit 104 is not opened, the processes at S2205 and S2206 are performed. In other words, the CPU 601 displays an instruction to open the manual feeding unit 104 on the operating unit 200 (S2205) and indicates the work portion by selectively projects an image onto the handle 71a of the manual feeding unit 104 with the projector unit 1 (S2206). FIG. 23 is a diagram illustrating a state in which an image is selectively projected onto a handle 71a of the manual feeding unit 104 by the projector unit 1.

In this embodiment, the projector unit 1 is disposed at the inner upper right of the printer main body 101 to prevent interference with the opening and closing of the right door 60, allowing projection of an image onto the manual feeding unit 104 and the right door 60 from above. For example, the CPU 601 controls the projector unit 1 so that a predetermined image is aligned with the handle 71a of the manual feeding unit 104, as shown in FIG. 23. As illustrated in FIG. 23, an image is projected so that a portion for which the user needs maintenance work can be identified by the user. This allows the user to recognize a maintenance portion more intuitively. After S2206, the processes from S2203 are repeated.

Figure 24A:
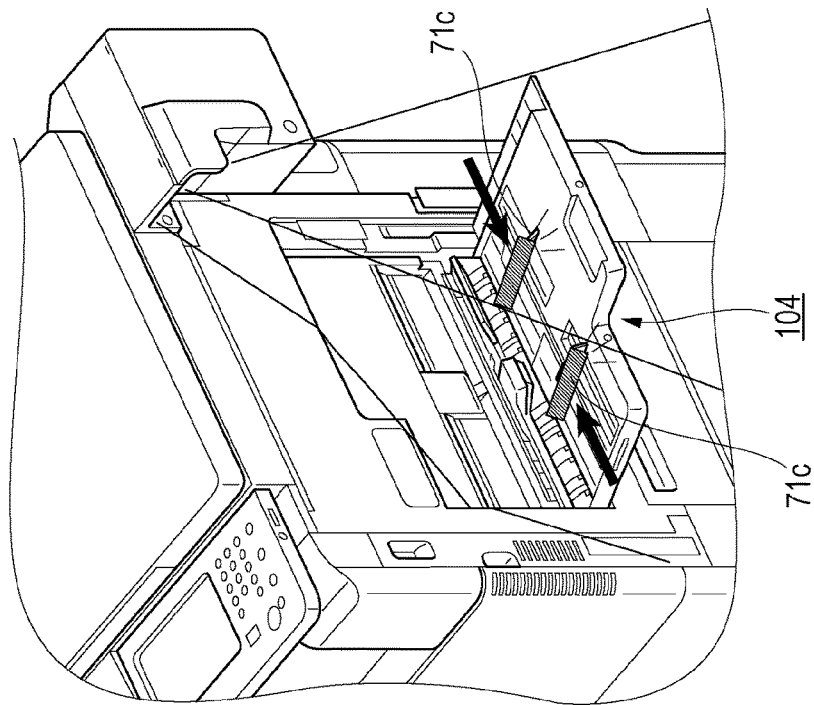
FIG. 24A is a diagram illustrating a state in which an image is projected by the projector unit.
Figure 24B:
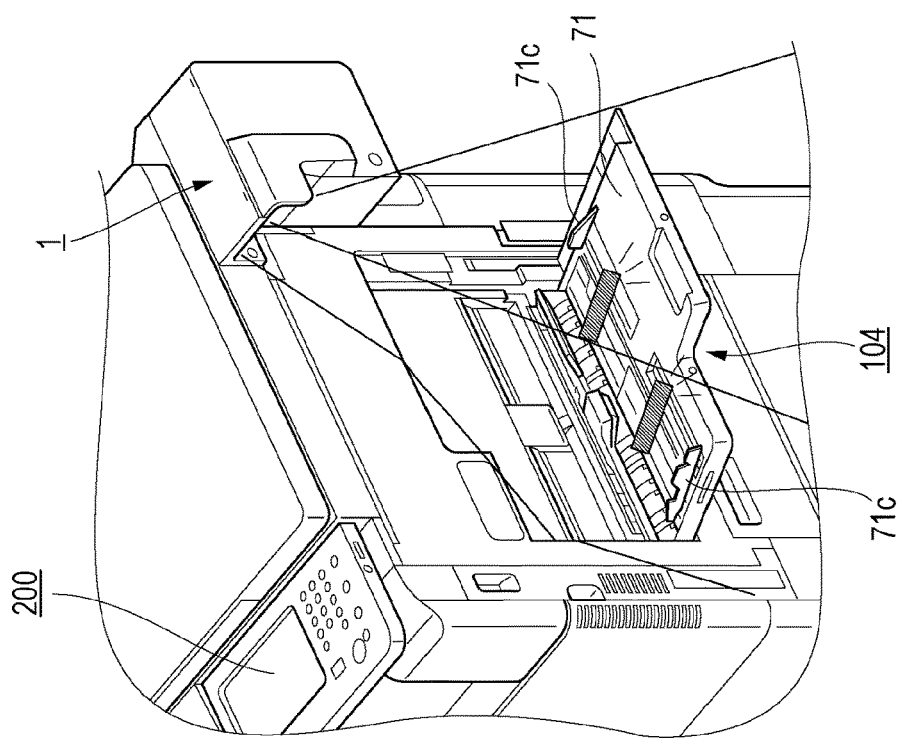
FIG. 24B is a diagram illustrating a state in which images are projected by the projector unit.

In contrast, if at S2204 the signal is OFF, and it is determined that the manual feeding unit 104 is opened, the CPU 601 monitors a signal from the sheet-feed-tray sheet-size detecting unit 45 (S2207). The CPU 601 detects the position of the sheet-feed-tray guides 71c based on the signal from the sheet-feed-tray sheet-size detecting unit 45 (S2208) and determines whether the width between the sheet-feed-tray guides 71c and the width of the set sheet size are equal to each other (S2209). If it is determined that the detected width between the sheet-feed-tray guides 71c and the width of the set sheet size are equal, the process goes to S2211. Otherwise, the process at S2210 is performed. In other words, the CPU 601 controls the projector unit 1 based on the detected positional information on the sheet-feed-tray guides 71c and projects the details of work (the position of the sheet-feed-tray guides 71c to be set) in the vicinity of the detected sheet-feed-tray guides 71c (S2210). FIGS. 24A and 24B are diagrams illustrating a state in which the details of work is projected in the vicinity of the detected sheet-feed-tray guides 71c. In FIG. 24A, images are projected to positions at which the sheet-feed-tray guides 71c are to be set. In FIG. 24B, images are projected at positions at which the sheet-feed-tray guides 71c are to be set, and arrow images directed to the positions are projected as the details of work. This configuration allows the user to be notified of the work portion more effectively. After S2210, the processes from S2207 are repeated.

Since the position of the sheet-feed-tray guides 71c can be detected at regular intervals, the CPU 601 may change the information projected by the projector unit 1 according to the detected positional information on the sheet-feed-tray guides 71c. This allows the work information (the direction of the arrows and the like) to match to the position of the sheet-feed-tray guides 71c even if changed in position.

Figure 25:
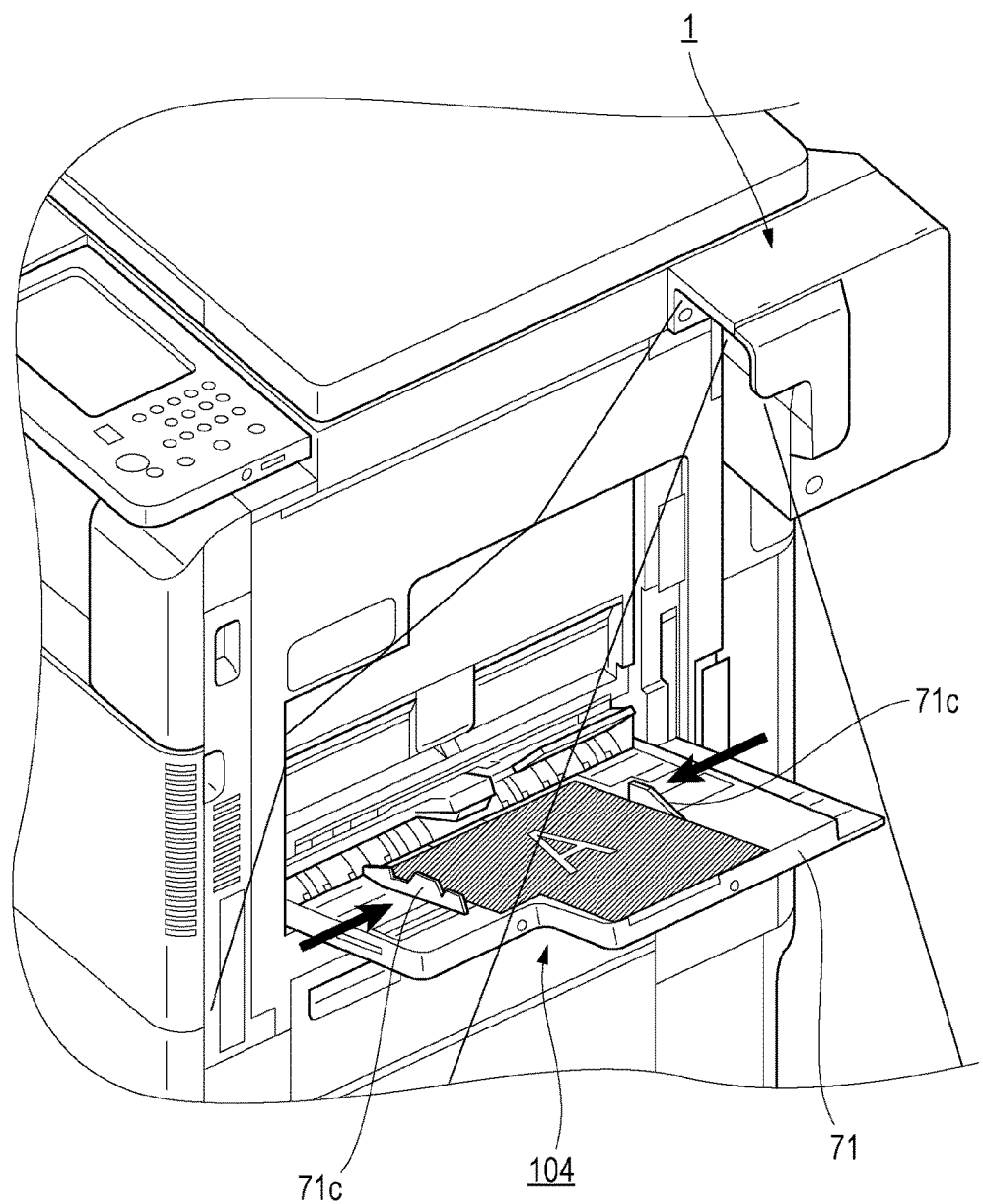
FIG. 25 is a diagram illustrating a state in which an image is projected by the projector unit.

If it is determined that the width between the sheet-feed-tray guides 71c detected at S2209 is equal to the width of the set sheets S, the CPU 601 controls the projector unit 1 to switch to display of an instruction to load the sheets S between the sheet-feed-tray guides 71c (S2211). FIG. 25 is a diagram illustrating a state in which instructing information for loading sheets S between the sheet-feed-tray guides 71c is projected by the projector unit 1. As illustrated in FIG. 25, work information (the gray portion between the sheet-feed-tray guides 71c) is projected onto a portion for which the user needs maintenance work. Although the work information is displayed in gray in FIG. 25, it can be displayed in text or figure. This eliminates the need for the user to alternately look at the operating unit 200 and a portion that needs maintenance work, enhancing user work efficiency.

Subsequently, the CPU 601 monitors a signal from the sheet-feed-tray sheet-presence detecting unit 44 (S2212) and determines whether sheets S are loaded on the basis of the signal (S2213). If the signal is OFF, and it is determined that no sheet is loaded, the processes from S2211 are repeated. In contrast, if the signal is ON, and it is determined that sheets S are loaded, the process shown in FIGS. 22A and 22B ends.

With the above configuration, the projector unit 1 is controlled based on the information from the detecting units, so that the user work portion is selectively indicated, and the details of related work are displayed in the vicinity. This configuration allows the user to be clearly notified of the work portion and details of the work of supplying sheets S to the manual feeding unit 104 according to the progress of the work.

Fifth Embodiment

In this embodiment, a case in which a jam clearing operation is performed when a jam occurs in the fixing unit 114 will be described as an example of the user maintenance work (user work).

Figure 26:
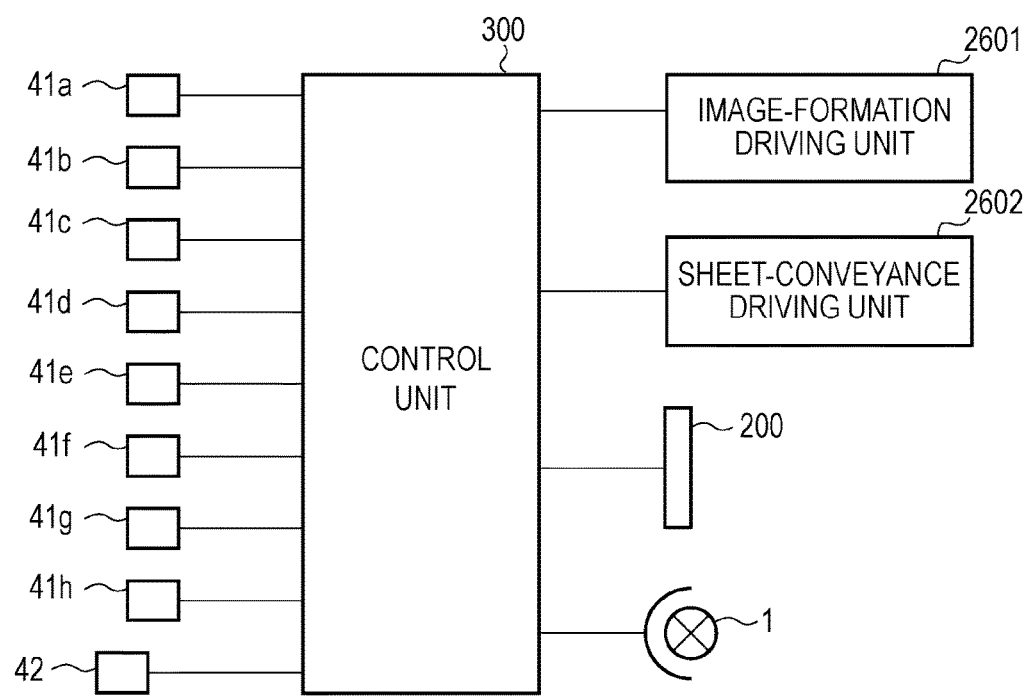
FIG. 26 is a block diagram illustrating the relationship among the control unit, detecting units, and an output unit according to a fifth embodiment of the present disclosure.

FIG. 26 is a block diagram illustrating the relationship among the control unit 300, detecting units, driving units, and an output unit. As illustrated in FIG. 26, the operating unit 200 and the projector unit 1 are connected to the control unit 300. The jam detecting units 41a, 41b, 41c, 41d, 41e, 41f, 41g, and 41h and the right-door open/close detecting unit 42 are also connected to the control unit 300. The control unit 300 controls information displayed by the operating unit 200 and the projector unit 1, an image-formation driving unit 2601, and a sheet-conveyance driving unit 2602 according to signals from the above detecting units 41a, 41b, 41c, 41d, 41e, 41f, 41g, 41h, and 42. In this embodiment, the image-formation driving unit 2601 is used to drive a block including the developing units 113 for use in the image forming process. The sheet-conveyance driving unit 2602 is used to drive a sheet conveying block including various rollers disposed in the sheet conveying path.

Figure 27B:
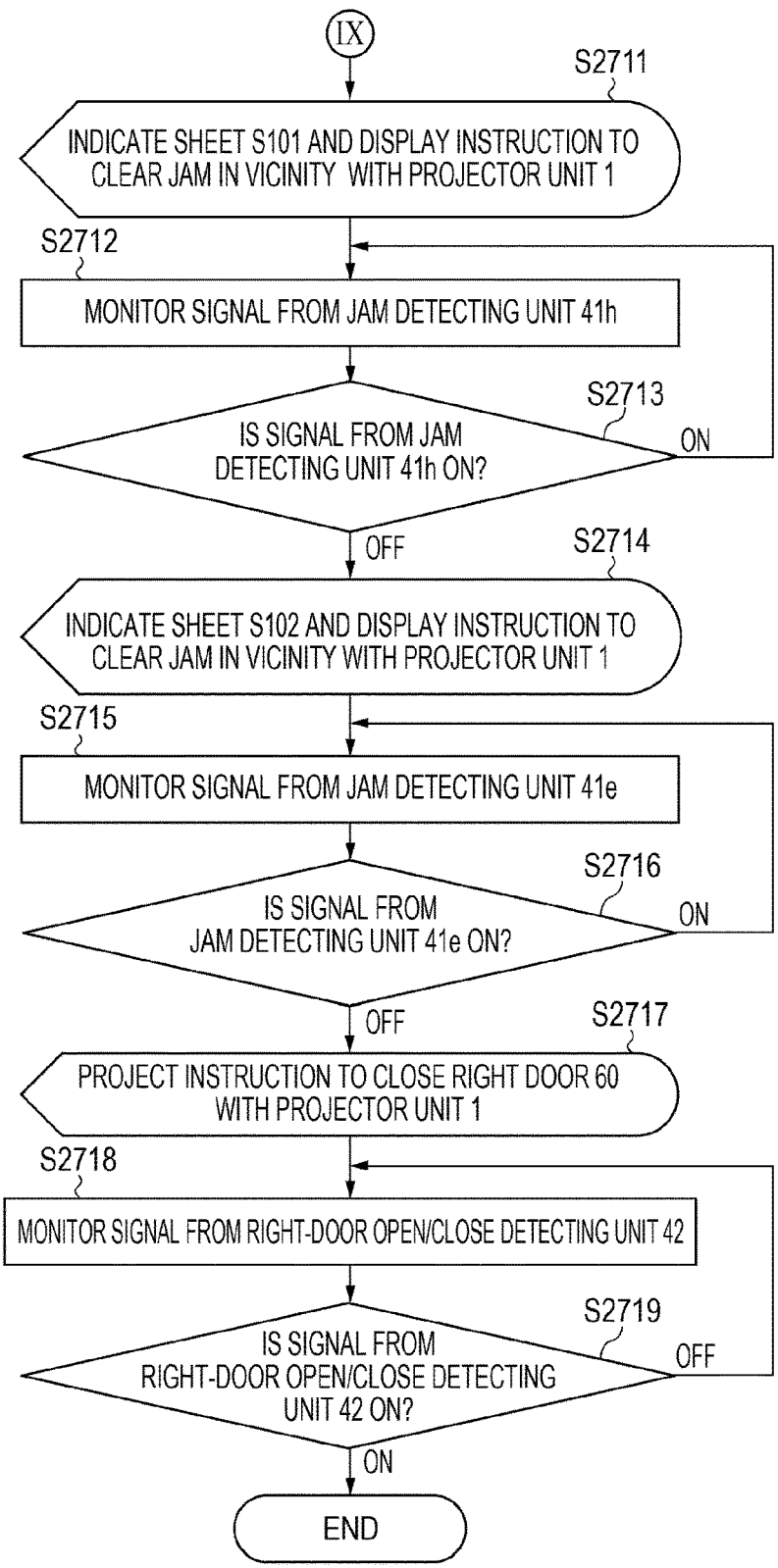
FIG. 27B is a flowchart for the display control process according to the fifth embodiment.

FIGS. 27A and 27B are flowcharts for a display control process when a jam clearing process is performed when a jam occurs in the fixing unit 114. In printing, the CPU 601 continuously conveys sheets S from the sheet container 11c, which is an example of the sheet container 11, with the sheet-conveyance driving unit 2602 to transfer and fix an image formed in the image-formation driving unit 2601 onto the sheets S (S2701). During the passage of sheets S, the CPU 601 monitors signals from the jam detecting units 41c, 41e, 41f, 41g, and 41h (S2702) and determines whether the signals are OFF for a predetermined detection time or more based on the signals (S2703).

If the signals are OFF for the predetermined detection time or more, it is determined that no jam occurs in the sheet conveying path, and the processes from S2702 are repeated. In contrast, if sheets S remain in the fixing unit 114 because of bending or the like of the sheets S, the signal from the jam detecting unit 41h is OFF for a predetermined time or more. In other words, occurrence of a sheet jam in the conveying path can be detected by detecting that the signal from the jam detecting unit 41h is OFF for a predetermined time or more. The sheet jam in the conveying path correspond to an event that needs maintenance work. In this case, the process goes from S2703 to S2704, at which the CPU 601 stops the operations of the image-formation driving unit 2601 and the sheet-conveyance driving unit 2602 (S2704).

Figure 28:
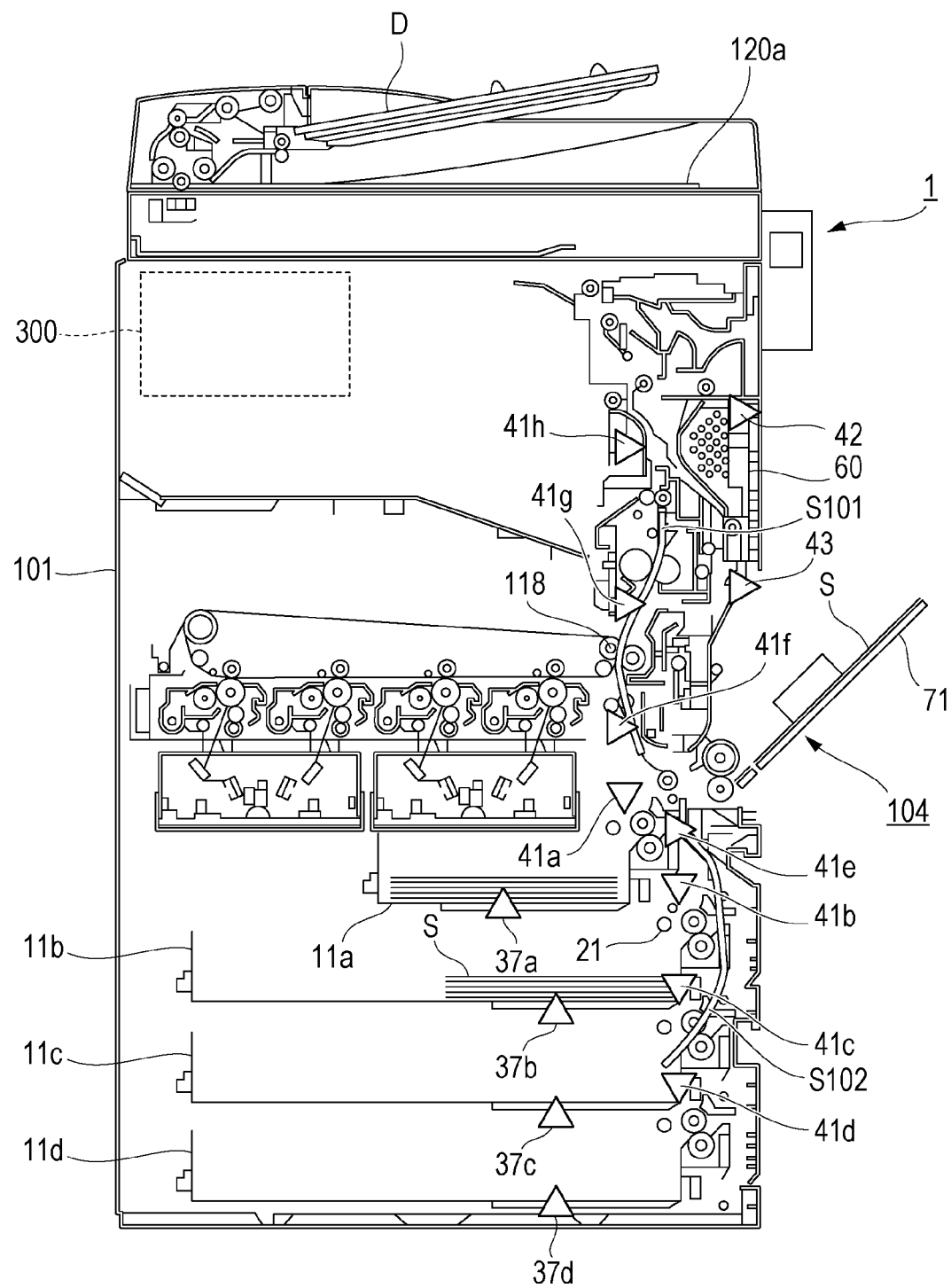
FIG. 28 is a diagram illustrating the layout of detecting units in the image forming apparatus.

After the operations of the image-formation driving unit 2601 and the sheet-conveyance driving unit 2602 are stopped, the CPU 601 monitors signals from the jam detecting units 41c, 41e, 41f, 41g, and 41h (S2705). The CPU 601 then detects the positions of a sheet 5101 and a sheet S102 remaining in the sheet conveying path illustrated in FIG. 28 (S2706). If the sheets 5101 and S102 remain in the conveying path, the printing operation cannot be performed. The user opens the right door 60 to access the sheet conveying path and removes the sheets 5101 and S102 (jam clearing work).

First, the CPU 601 displays information on the occurrence of the jam and an instruction to open the right door 60 on the operating unit 200 (S2707). The CPU 601 indicates a work portion by selectively projects an image onto the right-door handle 60a with the projector unit 1 (S2708). A method of selective projection has been described with reference to the above embodiments.

Figure 29:
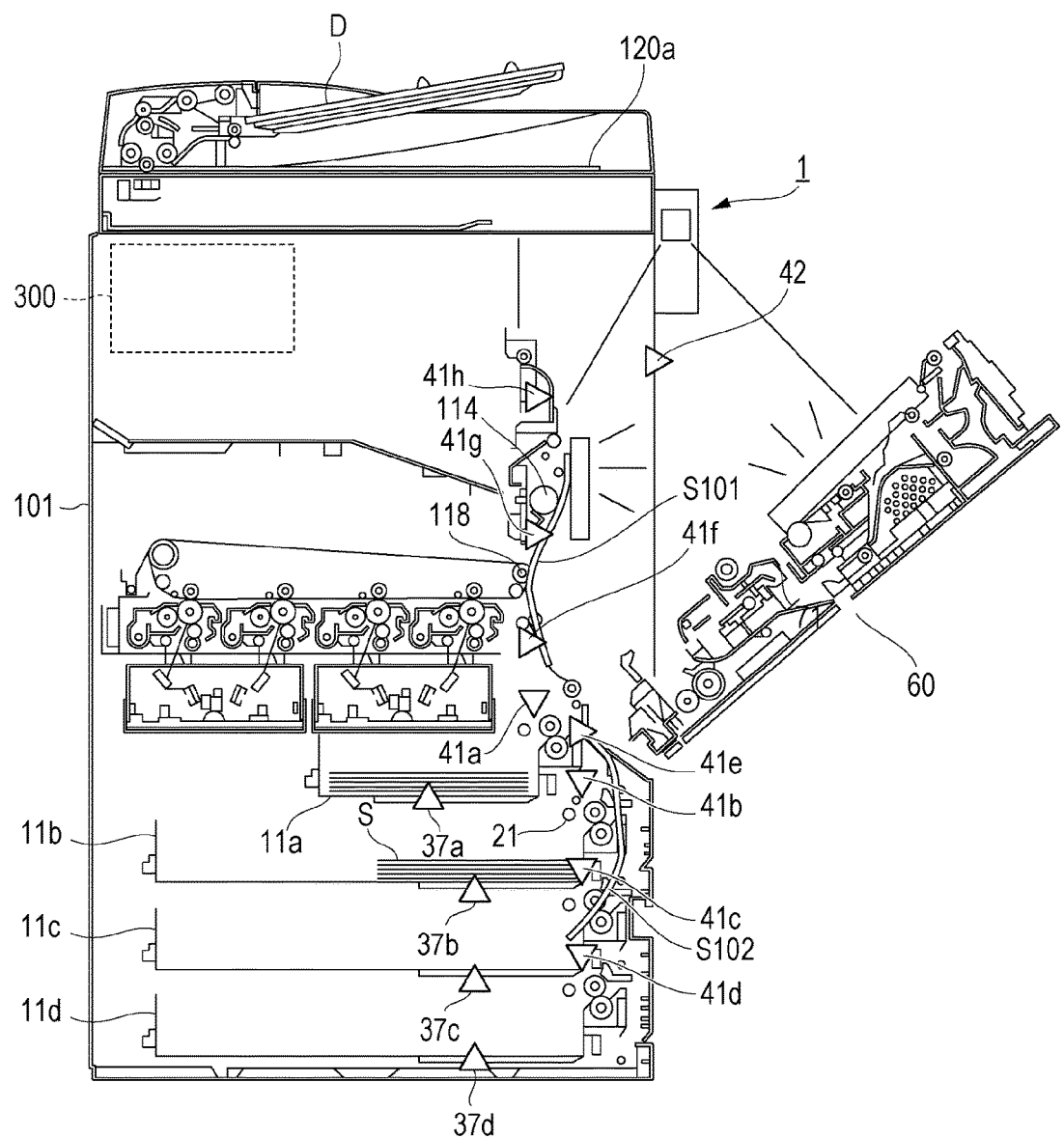
FIG. 29 is a diagram illustrating a state in which an image is projected by the projector unit.

The CPU 601 monitors a signal from the right-door open/close detecting unit 42 (S2709) and determines whether the user has opened the right door 60 based on the signal (S2710). If the signal is ON, and it is determined that the right door 60 is not opened, the processes from S2709 are repeated. In contrast, if the signal is OFF, and it is determined that the right door 60 is opened, the CPU 601 controls the projector unit 1 to switch the projection to selective projection of the sheet 5101 and display of information on an instruction to remove the sheet 5101 (S2711). FIG. 29 is a diagram illustrating a state in which an image is selectively projected onto the sheet 5101 and an instruction to remove the sheet 5101 is projected on the right door 60 in the vicinity thereof by the projector unit 1.

Figure 30:
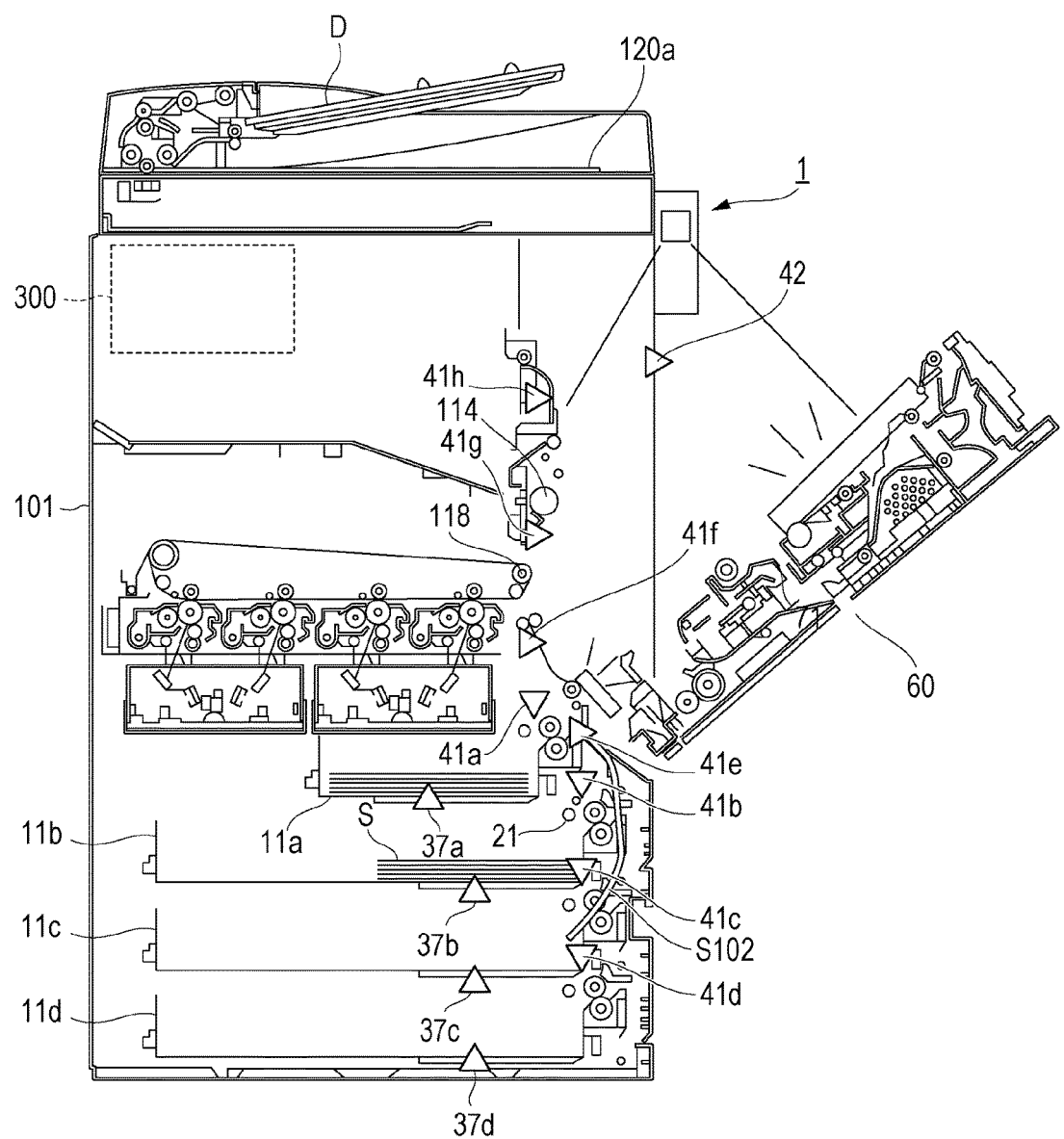
FIG. 30 is a diagram illustrating a state in which an image is projected by the projector unit.

The CPU 601 monitors a signal from the jam detecting unit 41h (S2712) and determines whether the sheet 5101 has been removed based on the signal (S2713). If the signal is ON, and it is determined that the sheet 5101 has not been removed, the processes from S2712 are repeated. In contrast, if the signal is OFF, and it is determined that the sheet 5101 has been removed, the CPU 601 controls the projector unit 1 to switch the projection to selective projection of the sheet S102 and display of information on an instruction to remove the sheet S102 (S2714). FIG. 30 is a diagram illustrating a state in which an image is selectively projected onto the sheet S102 and an instruction to remove the sheet S102 is projected on the right door 60 in the vicinity thereof by the projector unit 1.

As illustrated in FIGS. 29 and 30, a plurality of sheet jam portions are selectively indicated in sequence by the projector unit 1 as jams are cleared. This allows the user to efficiently perform maintenance work without looking at the operating unit 200.

The CPU 601 monitors a signal from the jam detecting unit 41e (S2715) and determines whether the sheet S102 has been removed based on the signal (S2716). If the signal is ON, and it is determined that the sheet S102 has not been removed, the processes from S2715 are repeated. In contrast, if the signal is OFF, and it is determined that the sheet S102 has been removed, the CPU 601 controls the projector unit 1 to project information on an instruction to close the right door 60 onto the right door 60 (S2717). The projection state is the same as that on the right door 60 in FIG. 30.

The CPU 601 monitors a signal from the right-door open/close detecting unit 42 (S2718) and determines whether the user has closed the right door 60 based on the signal (S2719). If the signal is OFF, and it is determined that the right door 60 has not been closed, the processes from S2718 are repeated. In contrast, if the signal is ON, and it is determined that the right door 60 has been closed, the process in FIGS. 27A and 27B ends and returns to the printing operation.

In this embodiment, a case in which a jam occurs in the fixing unit 114 is described. However, appropriate work instructions can be given also for jams in other places by switching the details of display of the operating unit 200 and the projector unit 1 according to signals from the jam detecting units 41a to 41h.

With the above configuration, the projector unit 1 is controlled based on the information from the detecting units, so that the user work portion is selectively indicated, and the details of related work are displayed in the vicinity. This configuration allows the user to be clearly notified of the work portion and details of the work of removing a jammed sheet according to the progress of the work.

The above embodiments can be embodied in one image forming apparatus 100. Having described still images, such as an arrow image, have been described as examples of projection images, another display method may be used to selectively project images to allow a maintenance position to be identified. For example, a moving image (picture), such as a continuously flowing arrow or a flashing arrow, may be projected in a different color from the color of the casing of the image forming apparatus 100. Alternatively, the projection range may be controlled so that a maintenance position can be identified by spot projection.

Thus, the above embodiments enhance user work efficiency.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-252407 filed Dec. 24, 2015, which is hereby incorporated by reference herein in its entirety.

What is claimed is:

1. An image forming apparatus for forming an image on a sheet, the apparatus comprising:
a projector that projects an image onto a projection target; and
one or more processors that execute a set of instructions to
detect an event that needs user work on the image forming apparatus; and
control the projector to project the image so that a target portion of the user work can be identified and to project an instruction image for performing the user work, based on a detected event,
wherein, on a basis of a detection that an amount of toner remaining in a toner bottle is low, the one or more processors execute the instructions to control the projector to project the image so that a cover of a container of the toner bottle can be identified and to control the projector to project the instruction image onto an opened cover of the container.

2. The image forming apparatus according to claim 1, wherein the one or more processors execute the instructions to control the projector to project an image for identifying the target portion of the user work onto the target portion of the image forming apparatus.

3. The image forming apparatus according to claim 1, wherein the one or more processors execute the instructions to control the projector to project the instruction image onto the target portion of the image forming apparatus needing the user work.

4. The image forming apparatus according to claim 1, wherein the one or more processors execute the instructions to control the projector to project the instruction image onto a different region from the target portion of the image forming apparatus needing the user work.

5. The image forming apparatus according to claim 1, wherein the image projected by the projector is at least one of a still image and a moving image.

6. The image forming apparatus according to claim 1, wherein the image projected by the projector comprises at least one of a figure and a text.

7. An image forming apparatus for forming an image on a sheet, the apparatus comprising:
- a projector that projects an image onto a projection target; and
- one or more processors that execute a set of instructions to
- detect an event that needs user work on the image forming apparatus; and
- control the projector to project the image so that a target portion of the user work can be identified and to project an instruction image for performing the user work, based on a detected event,
- wherein, on a basis of a detection that toner collected into a waste-toner container has reached a predetermined amount, the one or more processors execute the instructions to control the projector to project the image so that the cover of the container of the waste-toner container can be identified and control the projector to project the instruction image onto an opened cover of the container of the waste-toner container.

8. The image forming apparatus according to claim 7, wherein the image projected by the projector is at least one of a still image and a moving image.

9. An image forming apparatus for forming an image on a sheet, the apparatus comprising:
- a projector that projects an image onto a projection target; and
- one or more processors that execute a set of instructions to
- detect an event that needs user work on the image forming apparatus; and
- control the projector to project the image so that a target portion of the user work can be identified and to project an instruction image for performing the user work based on the detected event,
- wherein, on a basis of a detection that sheets in a sheet container has run out, the one or more processors execute the instructions to control the projector to project the image so that the sheet container can be identified and control the projector to project the instruction image onto a drawn sheet container in which the sheets have run out.

10. The image forming apparatus according to claim 9, wherein the image projected by the projector is at least one of a still image and a moving image.

11. An image forming apparatus for forming an image on a sheet, the apparatus comprising:
- a projector that projects an image onto a projection target; and
- one or more processors that execute a set of instructions to
- detect an event that needs user work on the image forming apparatus; and
- control the projector to project the image so that a target portion of the user work can be identified and to project an instruction image for performing the user work, based on a detected event,
- wherein, on a basis of a detection that a sheet jam has occurred in a sheet conveying path, the one or more processors execute the instructions to control the projector, upon detecting that a cover of a casing of the image forming apparatus is opened, to project the image so that a portion of the sheet jam can be identified.

12. The image forming apparatus according to claim 11, wherein the one or more processors execute the instructions to, if sheet jams at a plurality of portions is detected, control the projector to project the image so that the plurality of portions can be identified in sequence.

13. The image forming apparatus according to claim 11, wherein the one or more processors execute the instructions to control the projector to project the instruction image onto the opened cover.

14. The image forming apparatus according to claim 11, wherein the image projected by the projector is at least one of a still image and a moving image.

15. A method for controlling an image forming apparatus for forming an image on a sheet, the method comprising the steps of:
- detecting an event that needs user work on the image forming apparatus; and
- controlling a projector configured to project the image onto a projection target
- so that a target portion of the user work can be identified and to project an instruction image for performing the user work, based on a detected event,
- wherein, on a basis of a detection that an amount of toner remaining in a toner bottle is low, controlling the projector to project the image so that a cover of a container of the toner bottle can be identified and control the projector to project the instruction image onto an opened cover of the container.

16. A method for controlling an image forming apparatus for forming an image on a sheet, the method comprising the steps of:
- detecting an event that needs user work on the image forming apparatus; and
- controlling a projector configured to project an image on a projection target to project the image so that a target portion of the user work can be identified and to project an instruction image for performing the user work, based on a detected event,
- wherein, on a basis of a detection that toner collected into a waste-toner container has reached a predetermined amount, controlling the projector to project the image so that the cover of the container of the waste-toner container can be identified and controlling the projector to project the instruction image onto an opened cover of the container of the waste-toner container.

17. A method for controlling an image forming apparatus for forming an image on a sheet, the method comprising the steps of:
- detecting an event that needs user work on the image forming apparatus; and
- controlling a projector configured to project an image on a projection target to project the image so that a target portion of the user work can be identified and to project an instruction image for performing the user work based on the detected event,
- wherein, on a basis of a detection that sheets in a sheet container have run out, controlling the projector to project the image so that the sheet container can be identified and controlling the projector to project the instruction image onto a drawn sheet container in which the sheets have run out.

18. A method for controlling an image forming apparatus for forming an image on a sheet, the method comprising the steps of:
- detecting an event that needs user work on the image forming apparatus; and
- controlling a projector configured to project an image on a projection target to project the image so that a target portion of the user work can be identified and to project an instruction image for performing the user work, based on a detected event, wherein, on a basis of a detection that a sheet jam has occurred in a sheet conveying path, controlling the projector, upon detecting that a cover of a casing of the image forming apparatus is opened, to project the image so that a portion of the sheet jam can be identified.

* * * * *